(12) United States Patent
Zhou

(10) Patent No.: US 9,497,089 B2
(45) Date of Patent: Nov. 15, 2016

(54) METHOD AND DEVICE FOR SPREADING DEEP PACKET INSPECTION RESULT

(71) Applicant: Huawei Technologies Co., Ltd., Shenzhen, Guangdong (CN)

(72) Inventor: Yingwei Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 14/109,389

(22) Filed: Dec. 17, 2013

(65) Prior Publication Data

US 2014/0173104 A1 Jun. 19, 2014

Related U.S. Application Data

(63) Continuation of application No. PCT/CN2013/080594, filed on Aug. 1, 2013.

(30) Foreign Application Priority Data

Dec. 19, 2012 (CN) ........................... 2012 1 0553157

(51) Int. Cl.
*H04L 12/26* (2006.01)
*H04L 29/06* (2006.01)

(52) U.S. Cl.
CPC ............. *H04L 43/026* (2013.01); *H04L 43/02* (2013.01); *H04L 43/10* (2013.01); *H04L 63/1408* (2013.01); *H04L 69/22* (2013.01)

(58) Field of Classification Search
CPC . H04L 43/026; H04L 43/10; H04L 63/1408; H04L 69/22; H04L 43/02
See application file for complete search history.

(56) References Cited

U.S. PATENT DOCUMENTS 6,873,618 B1 * 3/2005 Weaver ............... H04L 12/1854
  370/389
7,746,953 B1 * 6/2010 Khan .................... H04L 1/1887
  375/295

(Continued)

FOREIGN PATENT DOCUMENTS

CN   101605093 A   12/2009
CN   101978677 A    2/2011

(Continued)

*Primary Examiner* — Brian J Gillis
*Assistant Examiner* — Gil H. Lee

(57) ABSTRACT

The present invention discloses a method for spreading a deep packet inspection result. The method includes: receiving, by an identification function network element, a data packet in IP network traffic; identifying the data packet; if the identification succeeds, save a first identification result obtained through identification in a local flow table of the identification function network element, and insert the first identification result in an extension field of the header of the data packet; if the identification fails, insert a second identification result in the header extension field of the data packet; send the data packet carrying the first identification result or the second identification result to a first downstream device. By means of the present invention, DPI service identification does not need to be performed on all network elements, thereby reducing a delay in executing a DPI service in an entire network and lowering a maintenance cost.

18 Claims, 11 Drawing Sheets

(56) References Cited

U.S. PATENT DOCUMENTS

| | | |
|---|---|---|
| 8,000,244 B1 | 8/2011 | Canion et al. |
| 2003/0067934 A1* | 4/2003 | Hooper .................. H04L 29/06 370/428 |
| 2004/0255162 A1* | 12/2004 | Kim .................... H04L 63/1408 726/23 |
| 2005/0232277 A1* | 10/2005 | See ........................ H04L 49/90 370/395.52 |
| 2009/0219930 A1* | 9/2009 | Dolganow .............. H04L 69/04 370/389 |
| 2009/0238192 A1 | 9/2009 | Dolganow et al. |
| 2009/0252148 A1* | 10/2009 | Dolganow ............ H04L 65/605 370/351 |
| 2012/0144061 A1 | 6/2012 | Song |
| 2012/0257628 A1* | 10/2012 | Bu ...................... H04L 61/2514 370/392 |
| 2013/0024553 A1* | 1/2013 | Mittal ................ H04L 41/0893 709/222 |

FOREIGN PATENT DOCUMENTS

| | | |
|---|---|---|
| CN | 101997826 A | 3/2011 |
| CN | 103067199 A | 4/2013 |

\* cited by examiner

| Option type (00011110) | Option length | Identification status code | Identification result | Extension information (strategy information, and the like) |
FIG. 8A
| Next Header | Hdr ext len | Option type (00011110) | Option length | Identification status code | Identification result | Extension information (strategy information, and the like) |
FIG. 8B
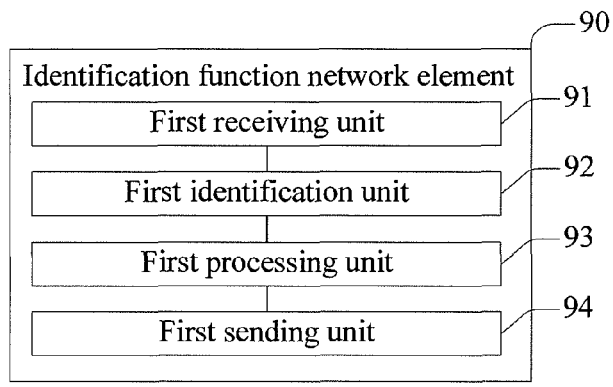
FIG. 9A
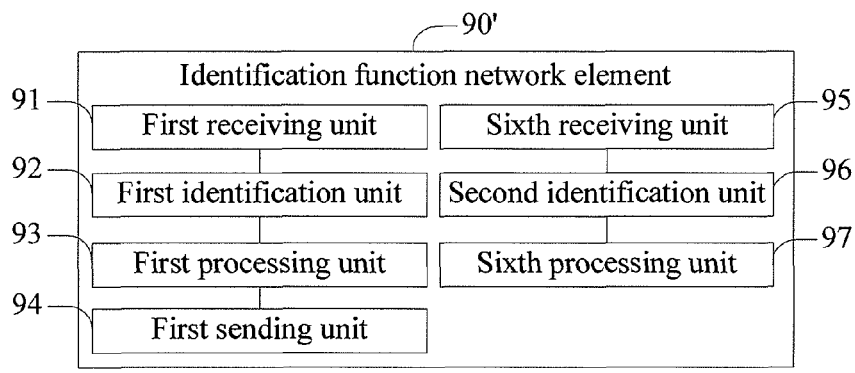
FIG. 9B

METHOD AND DEVICE FOR SPREADING DEEP PACKET INSPECTION RESULT

CROSS-REFERENCE TO RELATED APPLICATIONS

This application is a continuation of International Application No. PCT/CN2013/080594, filed on Aug. 1, 2013, which claims priority to Chinese Patent Application No. 201210553157.8, filed on Dec. 19, 2012, both of which are hereby incorporated by reference in their entireties.

TECHNICAL FIELD

The present invention relates to the field of communications, and in particular, to a method and a device for spreading a deep packet inspection result.

BACKGROUND

The deep packet inspection (Deep Packet Inspection, DPI) technology is capable of identifying specific Layer 7 protocols, applications, and the like in IP network traffic, for example, is capable of identifying that current network traffic is edonkey (edonkey) and is a P2P application. DPI is mainly used to strengthen delicacy operation for existing network traffic. An operator executes services such as protocol software usage analysis, traffic optimization, safety management, and content charging based on relevant data. To achieve this object, an operator deploys a DPI function on each network element in a network to form an identification function network element. The DPI function of an identification function network element mainly includes a protocol application identification capability and a packet parsing capability.

In the prior art, an identification function module is deployed on each network element that executes a DPI service in a network. A data packet in IP network traffic needs to be identified on each network element in the network. Then, the network element returns an identification result locally and executes subsequent processing on a relevant service based on the identification result, which results in a large delay in executing a DPI service in the entire network.

SUMMARY

The technical problem to be solved in the embodiments of the present invention is to provide a method and a device for spreading a deep packet inspection result, thereby reducing a delay in executing a DPI service in an entire network.

To solve the foregoing technical problem, in a first aspect, an embodiment of the present invention provides a method for spreading a deep packet inspection (DPI) identification result, including:

receiving, by an identification function network element, a data packet in network traffic;

performing DPI identification on the data packet; if the data packet is successfully identified, saving a first identification result obtained through identification in a local flow table of the identification function network element, and inserting the first identification result in an extension field of the header of the data packet; and if the data packet fails to be identified, inserting a second identification result in the header extension field of the data packet, where the second identification result is an initialization identification result when the identification function network element creates the local flow table; and sending the data packet carrying the first identification result or the second identification result to a first downstream device.

In a first possible implementation manner of the first aspect, the data packet is an IPv4 packet or an IPv6 packet. When the data packet is an IPv4 packet, the inserting the first identification result in an extension field of the header of the data packet includes: inserting the first identification result in an option field of the data packet header. When the data packet is an IPv6 packet, the inserting the first identification result in an extension field of the header of the data packet includes: inserting the first identification result in an extension header field of the data packet.

With reference to the first aspect or the first possible implementation manner of the first aspect, in a second possible implementation manner, the extension field of the header of the data packet further includes a first identification status code, which is used for indicating whether the data packet carries the first identification result or the second identification result for the first downstream device.

With reference to the first aspect or the first possible implementation manner of the first aspect, in a third possible implementation manner, when the data packet is the first data packet that enters the identification function network element for identification in the network traffic, after the inserting a second identification result in the header extension field of the data packet, the method further includes:

inserting an identification first packet flag in the extension field of the header of the data packet, so that the first downstream device sends a response packet carrying the first identification result to the identification function network element after receiving the data packet carrying the first packet flag, where the response packet further includes a response message generated by a server or user equipment after the server or user equipment receives the data packet, and the first packet flag is used for marking the first data packet that enters the identification function network element for identification in the network traffic;

receiving and parsing the response packet to acquire the first identification result, and saving the first identification result in the local flow table; and deleting the first identification result carried in the response packet and sending the response packet to a second downstream device.

With reference to the first aspect, or the first, second or third possible implementation manner of the first aspect, a fourth possible implementation manner of the first aspect is further provided: a first reverse identification result carrying flag is set in the local flow table and is used for indicating whether the first identification result is inserted in the extension field of the header of the received response packet, the first reverse identification result carrying flag is set to be true when the identification function network element successfully identifies the data packet; and after the sending the data packet carrying the first identification result to a first downstream device, the method further includes:

receiving a response packet sent by the server or user equipment after the server or user equipment receives the data packet, where the response packet is forwarded by the first downstream device to the identification function network element; and determining whether the first reverse identification result carrying flag is true, and if it is true, inserting the first identification result in the extension field of the header of the response packet, setting the first reverse identification result carrying flag to be false, and sending a response packet carrying the first identification result to the second downstream device.

With reference to the first aspect, or the first, second or third possible implementation manner of the first aspect, a fifth possible implementation manner of the first aspect is further provided:

a second reverse identification result carrying flag is set in the local flow table and is used for instructing the identification function network element whether to insert the first identification result in an extension field of a header of a next data packet received after the data packet is received, where the next data packet belongs to the network traffic, and after the sending the data packet carrying the first identification result to a first downstream device, the method further includes:

receiving a response packet, where the response packet is sent by the first downstream device to the identification function network element, the response packet carries a response message, the extension field of the header of the response packet carries identification result request information, the response message is generated by the server or user equipment after the server or user equipment receives the data packet, and the identification result request information is used for requesting the first identification result from the identification function network element;

parsing the response packet, setting the second reverse identification result carrying flag to be true, deleting the identification result request information carried in the response packet, and sending the response packet to the second downstream device, where the extension field of the header of the response packet further includes a third identification status code, which is used for indicating that the response packet carries the identification result request information for the identification function network element; and receiving a next data packet in the network traffic, determining whether the second reverse identification result carrying flag is true, and if it is true, setting the second reverse identification result carrying flag to be false, inserting the first identification result in the header extension field of the next data packet, and sending the next data packet to the first downstream device.

With reference to the first aspect, or the first, second or third possible implementation manner of the first aspect, a sixth possible implementation manner of the first aspect is further provided:

if the data packet fails to be identified, after the sending the data packet carrying the second identification result to a first downstream device, the method further includes:

receiving a response packet, where the response packet is generated by the server or user equipment after the server or user equipment receives the data packet, and is forwarded by the first downstream device to the identification function network element; and identifying the response packet to acquire the first identification result, saving the first identification result in the local flow table, and inserting the first identification result in an extension field of a header of a next data packet received by the identification function network element, where the next data packet belongs to the network traffic.

In a second aspect, an identification function network element is provided and includes:

a first receiving unit, configured to receive a data packet in network traffic;

a first identification unit, configured to perform deep packet inspection (DPI) identification on the data packet;

a first processing unit, configured to: when the first identification unit successfully identifies the data packet, save a first identification result obtained through identification in a local flow table of the identification function network element, and insert the first identification result in an extension field of the header of the data packet; when the first identification unit fails to identify the data packet, insert a second identification result in the header extension field of the data packet, where the second identification result is an initialization identification result when the identification function network element creates the local flow table; and a first sending unit, configured to send the data packet carrying the first identification result or the second identification result to a first downstream device.

In a first possible implementation manner of the second aspect, the first processing unit is further configured to insert a first identification status code in the extension field of the header of the data packet, and the first identification status code is used for indicating that the data packet carries the first identification result or the second identification result for the first downstream device.

With reference to the second aspect, or the first possible implementation manner of the second aspect, in a second possible implementation manner, if the data packet is the first data packet received by the identification function network element in the network traffic, the first processing unit is further configured to: after the inserting a second identification result in the header extension field of the data packet, insert an identification first packet flag in the extension field of the header of the data packet, so that the first downstream device sends a response packet carrying the first identification result to the identification function network element after receiving the data packet carrying the first packet flag, where the response packet further includes a response message generated by a server or user equipment after the server or user equipment receives the data packet, and the first packet flag is used for marking the first data packet that enters the identification function network element for identification in the network traffic.

With reference to the second possible implementation manner of the first aspect, in a third possible implementation manner, the network element further includes:

a second receiving unit, configured to: after the first sending unit sends the data packet carrying the second identification result and the identification first packet flag to the first downstream device, receive a response packet, where the response packet carries a response message, an extension field of a header of the response packet carries the first identification result, and the response message is generated by the server or user equipment after the server or user equipment receives the data packet;

a second processing unit, configured to parse the response packet to save the first identification result in the local flow table, and delete the first identification result carried in the response packet; and a second sending unit, configured to send the response packet processed by the second processing unit to a second downstream device.

With reference to the second aspect, or the first possible implementation manner of the second aspect, in a fourth possible implementation manner, the network element further includes:

a first configuration unit, configured to configure a first reverse identification result carrying flag in the local flow table, and when the first identification unit successfully identifies the data packet, set the first reverse identification result carrying flag to be true, where the first reverse identification result carrying flag is used for indicating whether the first identification result is inserted in the extension field of the header of the received response packet, and the response packet is generated by a server or user equipment after the server or user equipment receives the data packet, and is forwarded by the first downstream device to the identification function network element;

a third receiving unit, configured to: after the first sending unit sends the data packet carrying the first identification result to the first downstream device, receive the response packet;

a third processing unit, configured to: when the third receiving unit receives the response packet, determine whether the first reverse identification result carrying flag is true, and if it is true, insert the first identification result in the extension field of the header of the response packet, and set the first reverse identification result carrying flag to be false; and a third sending unit, configured to send the response packet inserted with the first identification result to the second downstream device.

With reference to the second aspect, or the first possible implementation manner of the second aspect, in a fifth possible implementation manner, the network element further includes:

a second configuration unit, configured to configure a second reverse identification result carrying flag in the local flow table, and when the fourth receiving unit receives the response packet, set the second reverse identification result carrying flag to be true, where the second reverse identification result carrying flag is used for indicating whether to insert the first identification result in an extension field of a header of a next data packet received by the identification function network element;

a fourth receiving unit, configured to: after the first sending unit sends the data packet carrying the first identification result to the first downstream device, receive a response packet, where the response packet is sent by the first downstream device to the identification function network element, the response packet carries a response message, the extension field of the header of the response packet carries identification result request information, the response message is generated by a server or user equipment after the server or user equipment receives the data packet or other data packets of the network traffic, and the identification result request information is used for requesting the first identification result from the identification function network element;

a fourth processing unit, configured to delete the identification result request information carried in the response packet;

a fourth sending unit, configured to send the response packet with the identification result request information being deleted to a second downstream device;

a fifth receiving unit, configured to receive a next data packet, where the next data packet is a next data packet received after the identification function network element receives the data packet, and the next data packet belongs to the network traffic;

a fifth processing unit, configured to determine whether the second reverse identification result carrying flag is true, and if it is true, insert the first identification result in an extension field of a header of the next data packet; and a fifth sending unit, configured to send the next data packet carrying the first identification result to the first downstream device.

With reference to the second aspect, or the first possible implementation manner of the second aspect, in a sixth possible implementation manner, the network element further includes:

a sixth receiving unit, configured to: after the first sending unit sends the data packet carrying the second identification result to the first downstream device, receive a response packet, where the response packet is generated by a server or user equipment after the server or user equipment receives the data packet, and is forwarded by the first downstream device to the identification function network element;

a second identification unit, configured to identify the response packet; and a sixth processing unit, configured to: after the second identification unit successfully identifies the response packet, acquire the first identification result, save the first identification result in the local flow table, and insert the first identification result in an extension field of a header of a next data packet received by the identification function network element, where the next data packet belongs to the network traffic.

Implementation of embodiments of the present invention has the following beneficial effects:

1) An identification function network element performs service identification on a received packet and inserts an identification result in an extension field of a header of the packet for sending, so that other network elements can acquire the identification result without the need of performing packet identification, thereby reducing a delay in executing a DPI service in an entire network.

2) Because only an identification function network element identifies a packet, the update of an identification database only involves the identification function network element, thereby lowering a maintenance cost.

3) When a first identification result saved in a local flow table of an identification function network element or a spread network element disappears (for example, an originally saved first identification result disappears due to restart or a failure of a network element), corresponding information can be inserted in a packet to request the first identification result from a corresponding network element without the need of performing identification again, thereby avoiding the phenomenon of a possible identification failure in another time of identification.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 8A is a schematic diagram of a format of an option field of an IPv4 packet header according to an embodiment of the present invention;

FIG. 8B is a schematic diagram of a format of an extension header field of an IPv6 packet header according to an embodiment of the present invention;

FIG. 9A is a schematic structural diagram of an identification function network element according to an embodiment of the present invention;

FIG. 9B is a schematic structural diagram of an identification function network element according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
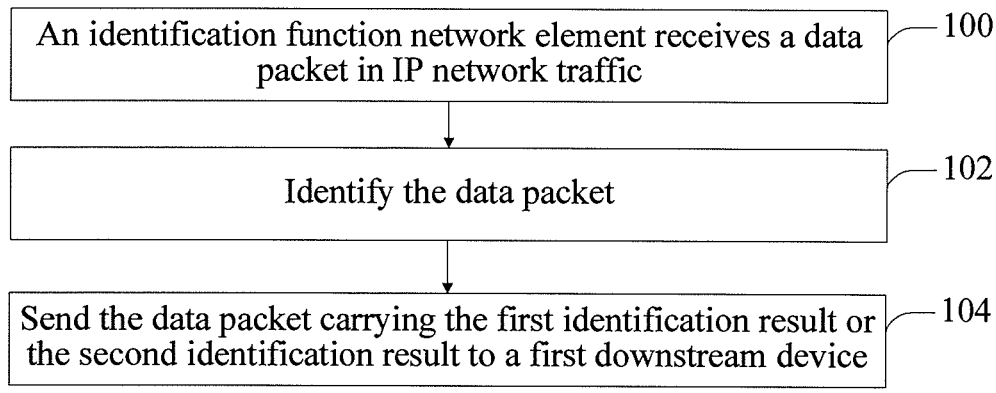
FIG. 1 is a schematic flow chart of a method for spreading a deep packet inspection result according to an embodiment of the present invention.

FIG. 1 is a schematic flow chart of a method for spreading a deep packet inspection result according to an embodiment of the present invention. Referring to FIG. 1, the method includes:

100. An identification function network element receives a data packet in network traffic.

102. Identify the data packet; if the data packet is successfully identified, save a first identification result obtained through identification in a local flow table of the identification function network element, and insert the first identification result in an extension field of the header of the data packet; and if the data packet fails to be identified, insert a second identification result in the header extension field of the data packet, where the second identification result is an initialization identification result when the identification function network element creates the local flow table.

104. Send the data packet carrying the first identification result or the second identification result to a first downstream device.

Optionally, in an implementation manner of this embodiment, the network traffic may specifically be IP network traffic, and the data packet includes: an IPv4 packet or an IPv6 packet. When the data packet is an IPv4 packet, the extension field of the header is an option field of the IPv4 packet header. When the data packet is an IPv6 packet, the extension field of the header is an extension header field of the IPv6 packet header.

Optionally, in an implementation manner of this embodiment, the extension field of the header of the data packet further includes a first identification status code, which is used for indicating that the data packet carries the first identification result or the second identification result for the first downstream device.

In 102, every time identification result information is inserted in the header extension field of the data packet, an IP packet header length, an IP packet length, and a checksum are adjusted (referred to as "adaptive adjustment" hereinafter).

In this embodiment, only an identification function network element identifies a data packet, and identification result information is inserted in an extension field of the header of the data packet for forwarding without the need of performing service identification on all network elements in a network, thereby reducing a delay in executing a DPI service in an entire network. In addition, as an identification function network element is only required to identify a packet, the update of an identification database only involves the identification function network element, thereby lowering a maintenance cost.

Optionally, in an implementation manner of this embodiment, if the data packet is the first data packet that enters the identification function network element for identification in the IP network traffic, when the data packet is successfully identified or fails to be identified, an identification first packet flag is further inserted in the extension field of the header of the data packet and is used for marking the first data packet that enters the identification function network element for identification in the IP network traffic. Exemplarily, the identification first packet flag can be inserted in a data packet in the following cases: a data packet that is received by an identification function network element for the first time and belongs to the IP network traffic; or, a data packet that is received for the first time after a first identification result of the IP network traffic is no longer saved in a local flow table due to restart or a failure of an identification function network element and belongs to the IP network traffic.

Further optionally, a data packet that includes the second identification result and the identification first packet flag can be used to request the first identification result from a spread network element (the spread network element may be the first downstream device, or may also be a downstream device of the first downstream device). For example, in the case that the local flow table of the spread network element saves the first identification result, if the identification function network element fails to identify the data packet, after the data packet carrying the second identification result and the identification first packet flag is sent to the first downstream device, the method further includes the following steps:

a. Receive a response packet, where the response packet is sent by the first downstream device to the identification function network element, the response packet carries a response message, an extension field of a header of the response packet carries the first identification result, the response message is generated by a server or user equipment after the server or user equipment receives the data packet, and the response packet is used for informing the identification function network element of the first identification result. b. Parse the response packet to save the first identification result in the local flow table. c. Delete the first identification result carried in the response packet and send the response packet to a second downstream device. Optionally, the extension field of the header of the response packet further includes a second identification status code, which is used for indicating that the response packet carries the first identification result for the identification function network element.

In this implementation manner, if an originally saved first identification result disappears due to restart or a failure of the identification function network element, the received data packet may not be identified (or, in the case that the data packet fails to be identified); instead, the first identification result is acquired from a spread network element that saves the first identification result, thereby ensuring that the identification function network element can acquire the first identification result.

Optionally, in an implementation manner of this embodiment, a first reverse identification result carrying flag is set in the local flow table and is used for instructing the identification function network element whether to insert the first identification result in an extension field of a header of a subsequently received response packet, where the response packet is generated by a server or user equipment after the server or user equipment receives the data packet, and is forwarded by the first downstream device to the identification function network element, the first reverse identification result carrying flag is set to be true when the identification function network element successfully identifies the data packet; and after the sending the data packet carrying the first identification result to a first downstream device, the method further includes the following steps:

a. Receive the response packet. b. Determine whether the first reverse identification result carrying flag is true, and if it is true, insert the first identification result in the extension field of the header of the response packet, set the first reverse identification result carrying flag to be false, and send a response packet carrying the first identification result to the second downstream device. Optionally, when the first identification result is inserted in the extension field of the header of the response packet, a fourth identification status code is further inserted in the extension field of the header of the response packet and is used for indicating that the response packet carries the first identification result for the second downstream device.

Optionally, in an implementation manner of this embodiment, a second reverse identification result carrying flag is set in the local flow table and is used for instructing the identification function network element whether to insert the first identification result in an extension field of a header of a next data packet received after the data packet is received, the next data packet belongs to the IP network traffic, and after the sending the data packet carrying the first identification result to a first downstream device, the method further includes the following steps:

a. Receive a response packet, where the response packet is sent by the first downstream device to the identification function network element, the response packet carries a response message, the extension field of the header of the response packet carries identification result request information, the response message is generated by a server or user equipment after the server or user equipment receives the data packet or a subsequent data packet of the IP network traffic, and the identification result request information is used for requesting the first identification result from the identification function network element. b. Parse the response packet, find that the extension field of the header of the response packet carries the identification result request information, set the second reverse identification result carrying flag to be true, delete the identification result request information carried in the response packet, and send the response packet to a second downstream device, where the extension field of the header of the response packet further includes a third identification status code, which is used for indicating that the response packet carries the identification result request information for the identification function network element. c. Receive a next data packet in the network traffic, determine whether the second reverse identification result carrying flag is true, and if it is true, set the second reverse identification result carrying flag to be false, insert the first identification result in an extension field of a header of the next data packet, and when it is determined according to a service configuration that the next data packet carrying the first identification result does not need to be discarded, send the next data packet to the first downstream device.

Optionally, in an implementation manner of this embodiment, if the data packet fails to be identified, after the sending the data packet carrying the second identification result to a first downstream device, the method further includes the following steps:

a. Receive a response packet, where the response packet is generated by a server or user equipment after the server or user equipment receives the data packet, and is forwarded by the first downstream device to the identification function network element. b. Identify the response packet. c. If the response packet is successfully identified to acquire the first identification result, save the first identification result in the local flow table, and insert the first identification result in an extension field of a header of a next data packet received by the identification function network element, where the next data packet belongs to the IP network traffic. d. If the response packet fails to be identified, identify the next data packet.

Further optionally, a third reverse identification result carrying flag is set in the local flow table of the identification function network element and is used for the identification function network element to determine whether to insert the first identification result in the header extension field of the next data packet according to the third reverse identification result. At this time, step c in this implementation manner can be implemented in the following manner:

When the identification function network element successfully identifies the response packet, set the third reverse identification result carrying flag to be true; forward the response packet to a second downstream device, or insert the first identification result in an extension field of a header of the response packet, and send the response packet to the second downstream device; receive the next data packet, determine whether the third reverse identification result carrying flag is true, and if it is true, insert the first identification result in an extension field of a header of the next data packet, set the third reverse identification result carrying flag to be false, and when it is determined according to a service configuration that the next data packet carrying the first identification result does not need to be discarded, send the next data packet to the first downstream device. Optionally, when the first identification result is inserted in the extension field of the header of the response packet, a fourth identification status code is further inserted in the extension field of the header of the response packet and is used for indicating that the response packet carries the first identification result for the second downstream device.

For the first, second, third, and fourth identification status codes in the foregoing implementation manners in this embodiment, exemplarily, please refer to the illustration in FIG. 8A and FIG. 8B. A person skilled in the art should understand that the first and fourth identification status codes may be applications of a same identification status code in different scenarios. In addition, a person skilled in the art should also understand that the first, second, and third reverse identification result flags mentioned in the foregoing embodiments may be applications of a same flag in different scenarios.

Figure 2:
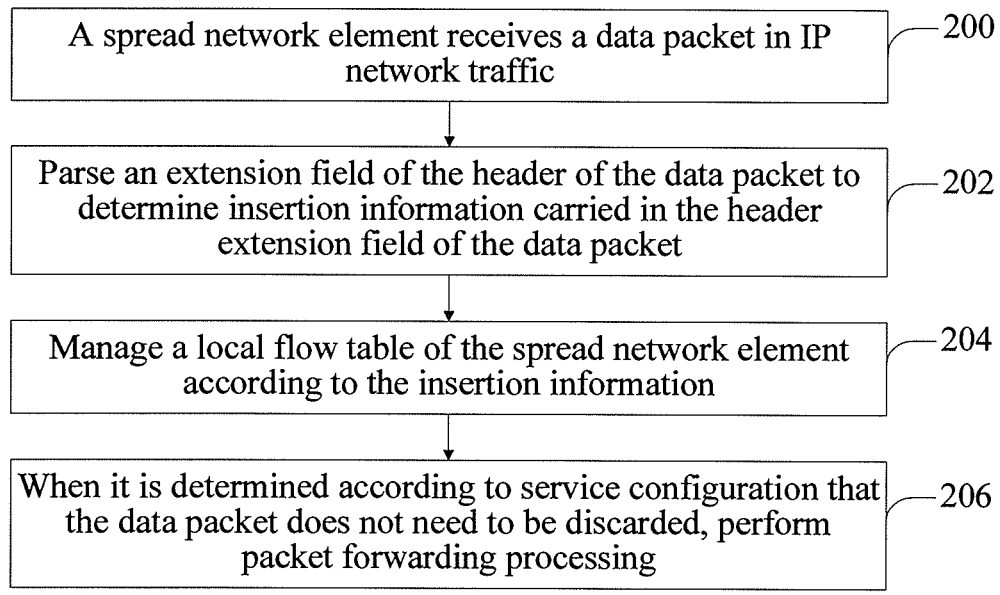
FIG. 2 is a schematic flow chart of a method for spreading a deep packet inspection result according to an embodiment of the present invention.

FIG. 2 is a schematic flow chart of a method for spreading a deep packet inspection result according to an embodiment of the present invention. Referring to FIG. 2, the method includes:

200. A spread network element receives a data packet in network traffic.

202. Parse an extension field of the header of the data packet to determine insertion information carried in the header extension field of the data packet.

204. Manage a local flow table of the spread network element according to the insertion information.

206. When it is determined according to a service configuration that the data packet does not need to be discarded, perform packet forwarding processing, which includes: sending the data packet to a first downstream device, so that the first downstream device manages a flow table according to the insertion information, or deleting the insertion information carried in the data packet and sending the data packet to the first downstream device.

Optionally, the data packet includes: an IPv4 packet or an IPv6 packet. When the data packet is an IPv4 packet, the extension field of the header is an option field of the IPv4 packet header. When the data packet is an IPv6 packet, the extension field of the header is an extension header field of the IPv6 packet header.

In this embodiment, a spread network element only needs to parse an extension field of a header of a data packet sent by an identification function network element to acquire identification result information and execute packet forwarding processing without the need of identifying the data packet, thereby reducing a delay in executing a DPI service in an entire network.

Optionally, in an implementation manner of this embodiment, 204 includes the following cases:

1. If the insertion information includes the first identification result, or, includes the first identification result and the first identification status code, save the first identification result in the local flow table.

2. If the insertion information includes the second identification result, or, includes the second identification result and the first identification status code, create or renew the local flow table without saving the second identification result (that is, the second identification result carried in the insertion information is not saved in the local flow table, and the operation does not affect the creation of the local flow table by the spread network element).

3. If the insertion information includes identification result request information, or, includes the identification result request information and the third identification status code, create or renew the local flow table.

The first identification result is an identification result when deep packet inspection identification is successfully completed for the data packet, the second identification result is an initialization identification result when the spread network element creates the local flow table, the first identification status code is used for indicating that the data packet carries the first identification result or the second identification result for the spread network element, the third identification status code is used for indicating that the data packet carries the identification result request information for the second downstream device, the identification result request information is used for requesting the first identification result from the second downstream device. Optionally, the second downstream device is an identification function network element.

Further optionally, when the insertion information includes the first identification result or the second identification result, the insertion information further includes: an identification first packet flag, which is used for marking the first data packet on which deep packet inspection identification is performed in the IP network traffic.

Optionally, in an implementation manner of this embodiment, a fourth reverse identification result carrying flag is set in the local flow table, and is used for the spread network element to determine whether to inform the second downstream device of the first identification result according to the fourth reverse identification result carrying flag.

When the insertion information includes the identification first packet flag and the second identification result, 204 may further include the following steps: determining whether the local flow table saves the first identification result, and if the local flow table saves the first identification result, set the fourth reverse identification result carrying flag to be true. After 206, the method may further include the following steps:

a. The identification result spread network element receives a response packet, where the response packet is generated by a server or user equipment after the server or user equipment receives the data packet, and is forwarded by the first downstream device to the spread network element.

b. Determine whether the fourth reverse identification result carrying flag is true, and if it is true, insert the first identification result in the extension field of the header of the response packet, and set the fourth reverse identification result carrying flag to be false. c. Send a response packet carrying the first identification result to the second downstream device, so as to inform the second downstream device of the first identification result.

Further optionally, in step b of this implementation manner, when the first identification result is inserted in the extension field of the header of the response packet, the second identification status code is further inserted in the header extension field of the response packet, so as to indicate that the response packet carries the first identification result for the second downstream device.

In this implementation manner, the spread network element may inform, after receiving the data packet carrying the second identification result and the identification first packet flag, in the case that the local flow table saves the first identification result, the second downstream device of the first identification result (for example, an identification function network element), so as to avoid the problem that the second downstream device fails to identify a subsequent data packet and therefore fails to acquire the first identification result. Optionally, in an implementation manner of this embodiment, an identification result wait packet count is set in the local flow table and is used for calculating the number of received data packets before the spread network element acquires the first identification result. 204 may further include the following steps: in the case that the local flow table does not save the first identification result, if the insertion information does not include the first identification result, or the insertion information includes the first identification result but does not save the first identification result in the local flow table, determining whether the identification result wait packet count exceeds a preset threshold value, and if the identification result wait packet count exceeds the preset threshold value, requesting the first identification result from the second downstream device.

Further optionally, the first identification result may be requested from the second downstream device in the following manner:

A fifth reverse identification result carrying flag is set in the local flow table and is used for the spread network element to determine whether to request the first identification result from the second downstream device according to the fifth reverse identification result carrying flag. In 204, if it is determined that the identification result wait packet count exceeds the preset threshold value, set the fifth reverse identification result carrying flag to be true. Then, after 206, the method further includes the following steps:

a. Receive a response packet, where the response packet is generated by a server or user equipment after the server or user equipment receives the data packet, and is forwarded by the first downstream device to the spread network element.
b. Determine that the fifth reverse identification result carrying flag is true, insert the identification result request information in an extension field of a header of the response packet, set the fifth reverse identification result carrying flag to be false, and reset the identification result wait packet count. c. Send the response packet carrying the identification result request information to the second downstream device, so as to request the first identification result from the second downstream device, so that after receiving the response packet carrying the identification result request information and when receiving a next data packet that belongs to the IP network traffic, the second downstream device inserts the first identification result in the extension field of the header of the next data packet and sends the next data packet to the spread network element. d. Receive the next data packet and perform parsing on it, and save the first identification result in the local flow table to acquire the first identification result.

In this implementation manner, when failing to acquire the first identification result within a preset threshold value range (that is, the first identification result is not saved in the local flow table), the spread network element proactively initiates an identification result request, so as to request the first identification result from the second downstream device (for example, the identification function network element). The problem that the spread network element fails to acquire the first identification result due to reasons such as failures and configurations is avoided.

A person skilled in the art should understand that the foregoing fourth and fifth reverse identification result carrying flags may be applications of a same flag in different scenarios.

Figure 3:
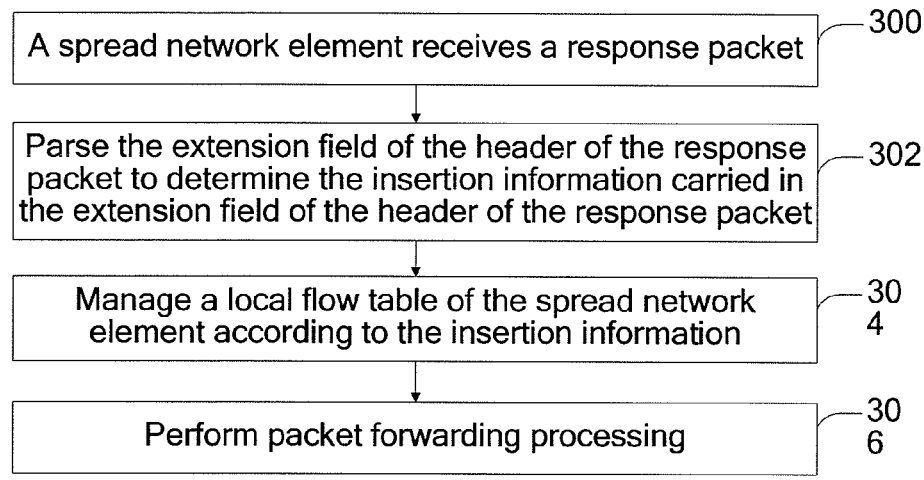
FIG. 3 is a schematic flow chart of a method for spreading a deep packet inspection result according to an embodiment of the present invention.

FIG. 3 is a schematic flow chart of a method for spreading a deep packet inspection result according to an embodiment of the present invention. Referring to FIG. 3, the method includes:

300. A spread network element receives a response packet, where the response packet is sent by a first downstream device to the spread network element, the response packet carries response information, an extension field of a header of the response packet carries insertion information, and the response information is generated by a server or user equipment after the server or user equipment receives a data packet in IP network traffic.

302. Parse the extension field of the header of the response packet to determine the insertion information carried in the extension field of the header of the response packet.

304. Manage a local flow table of the spread network element according to the insertion information.

306. Perform packet forwarding processing, which includes: sending the response packet to a second downstream device, so that the second downstream device manages a flow table according to the insertion information, or deleting the insertion information carried in the response packet and sending the response packet to the second downstream device.

Optionally, in an implementation manner of this embodiment, 304 includes: if the insertion information includes a first identification result and a fourth identification status code, saving the first identification result in the local flow table, where the first identification result is an identification result when deep packet inspection identification is successfully performed on the IP network traffic, and the fourth identification status code is used for indicating that the response packet carries the first identification result for the spread network element.

In this implementation manner, the spread network element is capable of parsing the extension field of the header of the response packet to acquire the first identification result. Optionally, in an implementation manner of this embodiment, if the insertion information includes identification result request information, or includes the identification result request information and a third identification status code, renew the local flow table and forwards the response packet to the second downstream device. If the insertion information includes the first identification result and a second identification status code, renew the local flow table without saving the first identification result, and forward the response packet to the second downstream device.

An IPv4 data packet is taken as an example in the following to describe the embodiments of the present invention exemplarily.

Figure 4:
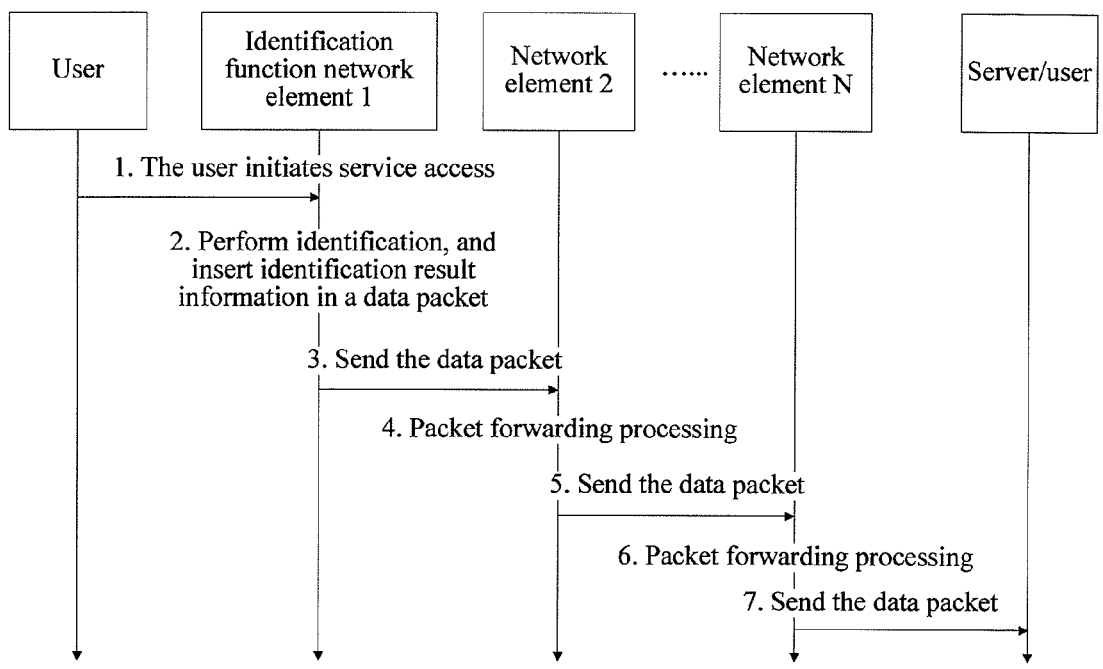
FIG. 4 is a schematic flow chart of a method for spreading a deep packet inspection result according to an embodiment of the present invention.

FIG. 4 is a schematic flow chart of a method for spreading a deep packet inspection result according to an embodiment of the present invention. Referring to FIG. 4, the method includes:

Step 1. A user initiates service access, for example, HTTP service access.

Step 2. An identification function network element 1 identifies a data packet, saves an acquired first identification result in a local flow table, inserts the first identification result in an IP option field of the data packet, and performs adaptive adjustment. Optionally, if the data packet is the first data packet that enters the identification function network element 1 for identification in the IP network traffic to which the data packet belongs, an identification first packet flag may be further inserted, together with the first identification result, in the IP option field. Optionally, when the first identification result is inserted in the IP option field of the data packet, a first identification status code may be further inserted and is used for indicating that the data packet carries the first identification result for a downstream network element.

Step 3. The identification function network element 1 sends the data packet carrying the first identification result to a spread network element 2 (the prerequisite for the identification function network element 1 and any network element among the spread network element 2 to a spread network element N to send a data packet is that: a service configuration does not cause that a data packet is discarded. For example, if the service configuration of one network element is to block or limit the traffic, which causes that a data packet is discarded, the network element does not forward a current data packet, and the current process ends. The prerequisite is also applicable in other embodiments of the present invention. To describe the embodiments of the present invention more clearly, it is presumed that a service configuration does not cause that a data packet is discarded hereinafter).

Step 4. The spread network element 2 performs packet forwarding processing. Specifically, the network element 2 parses the IP option field of the data packet, and saves the first identification result in the local flow table to acquire the first identification result. Then, execute step 5.

Step 5. The spread network element 2 sends the data packet carrying the first identification result to a downstream device.

FIG. 3 only shows the spread network element 2 and the spread network element N. A person skilled in the art should understand that a random number of spread network elements may also exist between the network element 2 and the network element N. The operations executed by these network elements may be the same as the operations executed by the network element 2, which are not described herein again. A random number of ordinary network elements may also exist after the network element N, and the ordinary network elements do not need to identify a data packet and does not need to acquire and spread a first identification result either.

Step 6. The spread network element N performs packet forwarding processing. Specifically, delete the insertion information in the IP option field of the data packet and perform adaptive adjustment. Then, execute step 7.

Optionally, in an implementation manner of this embodiment, the network element N may maintain the insertion information carried by the data packet to provide a service identification service for a user.

Step 7. Send the data packet.

In an embodiment of the present invention, when failing to identify a current data packet, the identification function network element may continue to identify a subsequent data packet. In the case that the identification function network element completes the identification on the data packet, a subsequent data packet in the IP network traffic to which the data packet belongs does not need to be identified, and the first identification result saved in the local flow table can be directly applied for service processing.

Figure 5:
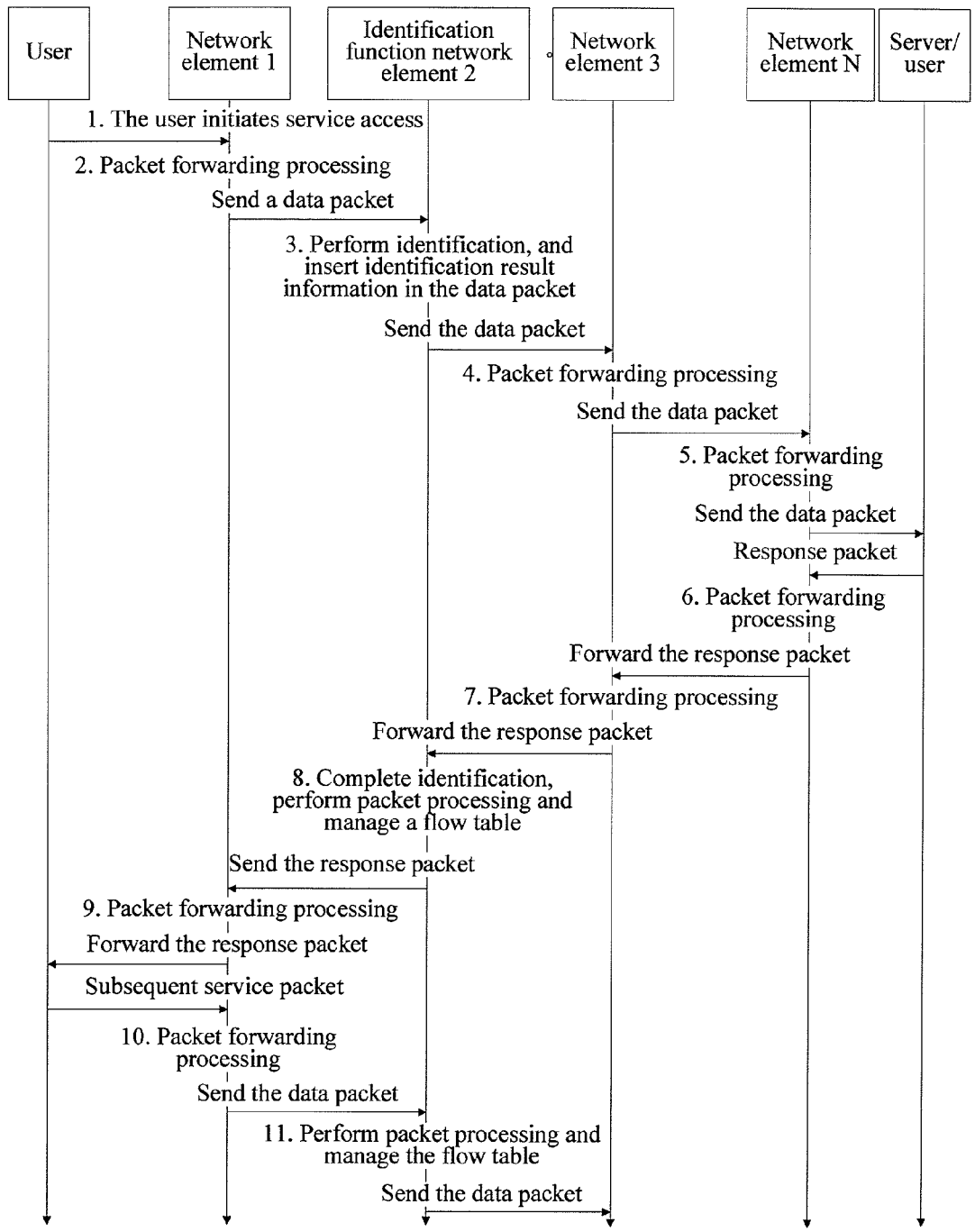
FIG. 5 is a schematic flow chart of a method for spreading a deep packet inspection result according to an embodiment of the present invention.

Of course, the identification function network element may be deployed at any position in a network, and the identification function network element may also be not able to acquire the first identification result through once of identification. For example, referring to FIG. 5, FIG. 5 is a schematic flow chart of a method for spreading a deep packet inspection result according to an embodiment of the present invention. The method includes:

Step 1. A user initiates service access.

Step 2. A spread network element 1 receives a data packet and performs packet forwarding processing. Specifically, create or renew a flow table (for example, renew information such as access time of network traffic), and then send the data packet to an identification function network element 2.

Step 3. The identification function network element 2 identifies the received data packet; when the identification fails, inserts a second identification result and an identification first packet flag in an IP option field of the data packet and performs adaptive adjustment. Then, send the data packet that has undergone the foregoing processing to a spread network element 3. Optionally, when the second identification result and the identification first packet flag are inserted in the IP option field of the data packet, a first identification status code may further be inserted and is used for indicating that the data packet carries the second identification result for a downstream network element.

Step 4. The spread network element 3 performs packet forwarding processing. Specifically, the network element 3 parses the IP option field of the data packet and finds that only the identification first packet flag exists and the identification result is an initial value (that is, the second identification result), renews or creates a flow table without saving the identification result, and then forwards the data packet to the downstream network element.

FIG. 5 only shows the spread network element 1, the spread network element 3, and the spread network element N. A person skilled in the art should understand that a random number of spread network elements may also exist between the network element 1 and the network element 2, and between the network element 3 and the network element N. The operations executed on a packet by a network element between the network element 3 and the network element N in the uplink direction and the downlink direction may be the same as the operations executed by the network element 3, which are not described herein again.

Step 5. The spread network element N performs packet forwarding processing. Specifically, parse the IP option field of the data packet and find that only the identification first packet flag exists and the identification result is an initial default value, and create or renew a flow table without saving the identification result. Delete the insertion information in the IP option field of the data packet and perform adaptive adjustment, and then send the data packet to a peer user or server.

Step 6. The spread network element N receives a response packet sent by the peer user or server and performs packet forwarding processing. Specifically, parse an IP option field of the response packet and find that insertion information is not included, and only renew the flow table and forward the response packet to the spread network element 3.

Step 7. Please refer to step 6.

Step 8. The identification function network element 2 identifies the response packet and succeeds in the identification to acquire a first identification result, and performs packet processing and manages the flow table. Specifically, save the first identification result in the local flow table, set a predefined reverse identification result carrying flag (the reverse identification result carrying flag here may be an uplink identification result carrying flag) in the local flow table to be true, insert the first identification result in the IP option field of the response packet, perform adaptive adjustment, and send a response packet downstream. Optionally, when the first identification result is inserted in the IP option field of the response packet, a fourth identification status code may be further inserted and is used for indicating that the response packet carries the first identification result for the downstream spread network element.

Step 9. The spread network element 1 receives the response packet carrying the first identification result and performs packet forwarding processing. Specifically, parse the IP option field of the data packet and find that the data packet carries the first identification result, and save the first identification result in the local flow table. Then, optionally, the network element 1 directly forwards the response packet to a user equipment. Alternatively, the network element 1 deletes the insertion information in the response packet, performs adaptive adjustment, and sends the response packet to the user equipment.

Step 10. The spread network element 1 receives a subsequent service packet in a same piece of IP network traffic and performs packet forwarding processing. Specifically, determine that the local flow table saves the first identification result of the IP network traffic to which the current data packet belongs, and renew the flow table, perform service processing according to first identification result, and send the data packet.

Step 11. The identification function network element 2 receives the data packet, does not perform identification, performs packet processing, and manages the flow table. Specifically, determine that the reverse identification result carrying flag is true, insert the first identification result in the IP option field of the data packet and perform adaptive adjustment, set the reverse identification result carrying flag to be false, and then send the data packet that has undergone the foregoing processing. Optionally, when the first identification result is inserted in the IP option field of the data packet, a first identification status code may be further inserted.

Subsequently, please refer to the operations executed by the network element 2 and the network element N in the embodiment shown in FIG. 3 for the operations executed by the network element 3 and the network element N, which are not described herein again.

In this embodiment, a reverse identification result carrying flag is predefined in a local flow table, so that after a response packet is successfully identified, a first identification result is inserted in an IP option field of a subsequently received next data packet, thereby implementing fast spread of the first identification result.

In another embodiment of the present invention, referring to FIG. 5, it is assumed that the spread network element 1 does not exist in the network, and the identification function network element 2 directly interfaces with the user. In this case, in step 8, that the identification function network element 2 performs packet processing and manages a flow table includes: saving the acquired first identification result in the local flow table, setting the predefined reverse identification result carrying flag in the local flow table to be true. Then, optionally, the network element 2 forwards the response packet, or, the network element 2 inserts the first identification result in the IP option field of the response packet, performs adaptive adjustment, and sends the response packet to the user equipment. The operations executed by other network elements remain unchanged.

In yet another embodiment of the present invention, referring to FIG. 5, if in step 8, the identification function network element 2 fails to identify the response packet, the identification function network element 2 identifies the received data packet in step 11.

Figure 6:
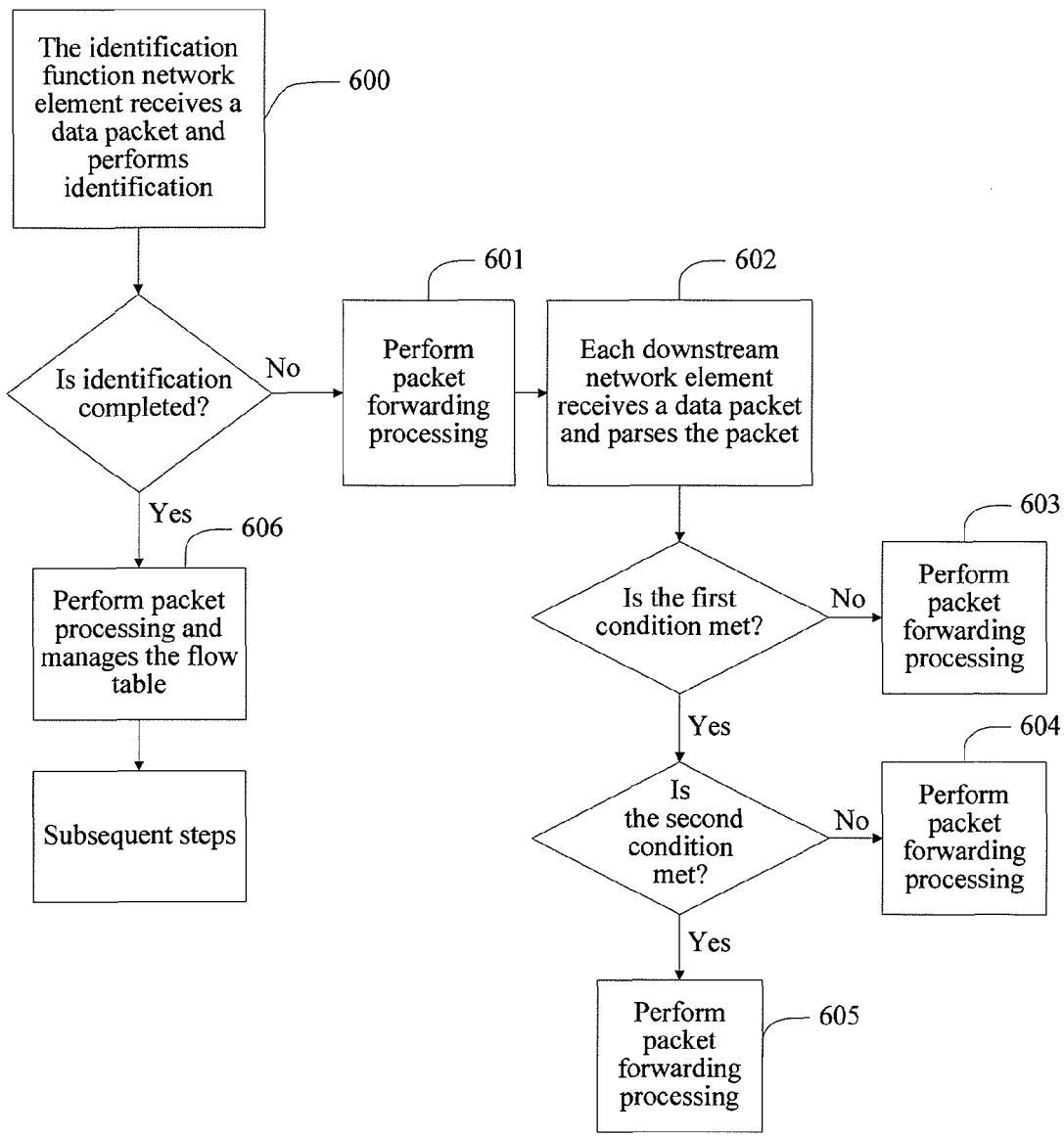
FIG. 6 is a schematic flow chart of a method for spreading a deep packet inspection result according to an embodiment of the present invention.

FIG. 6 is a schematic flow chart of a method for spreading a deep packet inspection result according to an embodiment of the present invention. Referring to FIG. 6, the method includes:

600. The identification function network element receives a data packet in IP network traffic and identifies the data packet, and if the identification fails, execute 601 and subsequent steps; otherwise, execute 606 and subsequent steps.

601. The identification function network element performs packet forwarding processing. Specifically, insert a second identification result in an IP option field of the data packet and perform adaptive adjustment, and then perform subsequent service processing (including services such as blocking, traffic limiting, charging, which are not limited in the present invention). If that the identification function network element receives the data packet belongs to the following cases, the IP option field of the data packet is further inserted with an identification first packet flag (the flag is used for marking that the received data packet is the first data packet that enters the identification function network element for identification in the IP network traffic to which the data packet belongs): 1. The identification function network element receives a data packet that belongs to the IP network traffic for the first time. 2. A local flow table no longer saves the first identification result of the IP network traffic due to restart or a failure of the identification function network element, and subsequently receives a data packet that belongs to the IP network traffic for the first time.

602. Each downstream spread network element of the identification function network element receives a data packet and performs packet parsing. If the parsing result does not meet a first condition, execute 603. If the parsing result meets the first condition but does not meet a second condition, execute 604. If the parsing result meets the first condition and the second condition at the same time, execute 605.

The first condition is: parse the IP option field of the data packet and determine that the data packet includes the second identification result and the identification first packet flag. The second condition is: the local flow table of the spread network element that performs data packet parsing currently saves the first identification result.

603. A spread network element that does not meet the first condition performs packet forwarding processing.

For example, a current spread network element in the downstream network elements receives a data packet, where the data packet only includes a second identification result, renews or creates a flow table, and then forwards the data packet to the downstream network element, or deletes the insertion information in the data packet and sends the data packet to the downstream network element. For another example, the current spread network element in the downstream network elements receives a data packet, where the data packet does not include the insertion information, and forwards the data packet downstream.

If the current spread network element is a network element that interfaces with a user/server, for the subsequent processing steps, reference may be made to the embodiment shown in FIG. 5, and the identification function network element identifies the response packet. If the identification of the response packet is completed, execute the corresponding steps in the embodiment shown in FIG. 5. If the identification of the response packet fails, continue to identify a subsequently received data packet, and the rest may be deduced by analogy.

604. A spread network element that meets the first condition but does not meet the second condition performs packet forwarding processing. For example, a downstream current spread network element receives a data packet, where the data packet only includes the second identification result and the identification first packet flag, and if the current spread network element does not have a local flow table (for example, the local flow table disappears due to restart of the current network element), creates a flow table, and forwards the data packet, or deletes the insertion information in the data packet and sends the data packet; if the local flow table of the current network element does not save the first identification result, renews the flow table (for example, renews access time of the current IP network traffic) and forwards the data packet, or deletes the insertion information in the data packet and sends the data packet.

If the current spread network element is a network element that interfaces with the server/user, the subsequent processing steps are the same as the subsequent processing steps of 603, which are not described herein again.

605. A downstream network element that meets the first condition and the second condition performs packet forwarding processing. In this case, the current spread network element considers the insertion information in the data packet as that the identification function network element requests the first identification result from the spread network element. Therefore, the current spread network element deletes the insertion information in the IP option field of the data packet, performs adaptive adjustment, sends the processed data packet (or, forwards the data packet that carries the insertion information) to the downstream network element, and inserts the first identification result in an IP option field of a subsequently received response packet. Optionally, when the first identification result is inserted in the IP option field of the subsequently received response packet, a second identification status code may be further inserted and is used for indicating that the response packet carries the first identification result for the identification function network element. Specifically, this is implemented by using the following steps:

Set a reverse identification result carrying flag (the reverse identification result carrying flag here may be a downlink identification result carrying flag) in a local flow table of a current spread network element. When the current spread network element determines that the received data packet carries the second identification result and the identification first packet flag and the local flow table saves the first identification result, set the reverse identification result carrying flag to be true, delete the insertion information in the IP option field of the data packet, perform adaptive adjustment, and send the packet. Subsequently, when the response packet is received, determine whether the reverse identification result carrying flag is true, and if it is true, insert the first identification result (or the first identification result and the second identification status code) in the IP option field of the response packet, perform adaptive adjustment, set the reverse identification result carrying flag to be false, and then send the processed response packet; the identification function network element receives the response packet (the response packet may be forwarded via other spread network elements; when other spread network elements receive a response packet, if it is found through parsing that the response packet carries the first identification result and the second identification status code, the response packet is directly forwarded downstream without processing), parses the IP option field of the response packet to acquire the first identification result, saves the first identification result to the local flow table, deletes the insertion information in the response packet, performs adaptive adjustment, and sends the response packet.

Apparently, 602, 603, 604, and 605 may be one cyclic execution process, which does not end until all downstream spread network elements of the identification function network element have executed corresponding operations according to the conditions that the spread network elements meet.

606. The identification function network element performs packet processing and manages the flow table.

Optionally, for the description of 606 and subsequent steps thereof, please refer to the corresponding description in the embodiment shown in FIG. 4.

Optionally, 606 and the subsequent steps include the following content:

a. A reverse identification result carrying flag (the reverse identification result carrying flag here may be a downlink identification result carrying flag) is predefined in a local flow table of an identification function network element. When a data packet is successfully identified, save an acquired first identification result in the local flow table, insert the first identification result in the IP option field of the data packet, perform adaptive adjustment, set the reverse identification result carrying flag to be true, and send the processed data packet.

b. Each downstream network element receives the data packet and performs packet forwarding processing. For example, please refer to step 3 to step 7 in the embodiment shown in FIG. 4.

c. In the downlink direction, each upstream spread network element of the identification function network element receives a response packet and forwards the response packet to the identification function network element. For example, please refer to step 6 and step 7 in the embodiment shown in FIG. 4.

d. The identification function network element receives a response packet, determines that the reverse identification result carrying flag is true, inserts the first identification result in an IP option field of the response packet, performs adaptive adjustment, sets the reverse identification result carrying flag to be false, and then sends the response packet.

This embodiment can implement:

In the case that each network element has acquired the first identification result, if the identification function network element is faulty or restarted (or, the identification function network element and any downstream network element thereof is faulty or restarted), when receiving data traffic in the uplink direction, the identification function network element can request the first identification result from the downstream spread network element thereof to acquire the first identification result. If the identification function network element is faulty or restarted and subsequently data traffic in the downlink direction is received, at this time, each network element in the network can only forward the packet in the downlink direction and renew the flow table, and then the identification function network element performs corresponding processing on a subsequent uplink data packet (for example, inserts an identification first packet flag and a second identification result). In the prior art, when the network element deployed with an identification function is restarted, for IP network traffic for which a part of data interactions have been completed, as an identification module may fail to acquire a corresponding feature, the situation that the identification fails may occur.

Figure 7:
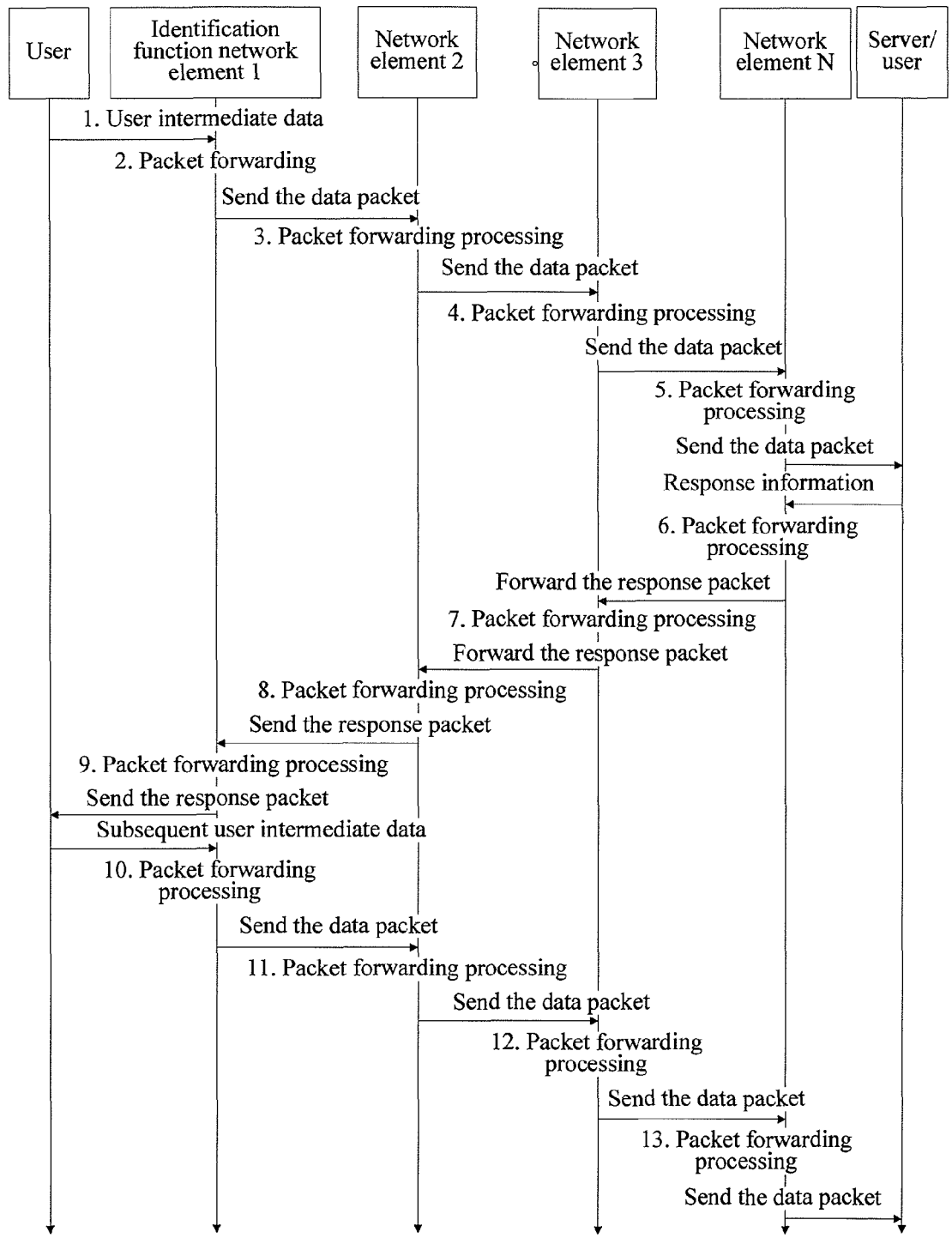
FIG. 7 is a schematic flow chart of a method for spreading a deep packet inspection result according to an embodiment of the present invention.

The present invention further provides a method for a faulty network element to acquire a first identification result. Referring to FIG. 7, FIG. 7 is a schematic flow chart of a method for spreading a deep packet inspection result according to an embodiment of the present invention. The method includes:

The background of this embodiment is that: an identification function network element 1 has completed the identification of a data packet, and all other network elements have saved the first identification result. In a process of sending uplink intermediate data traffic, a spread network element 2 has received a data packet that exceeds a preset threshold value but has not acquired the first identification result yet (for example, the spread network element 2 is faulty, which results in this situation).

Step 1. A user sends intermediate data to the identification function network element 1.

Step 2. The identification function network element 1 receives a data packet. Because the first identification result of IP network traffic to which the data packet belongs has been acquired before, renew the flow table, perform corresponding service processing, and then forward the data packet.

Step 3 to step 8: The spread network element 2 sends a packet that includes identification result request information to request the first identification result from the identification function network element 1, which are specifically:

Step 3. After receiving the data packet, the spread network element 2 determines that an identification result wait packet count exceeds a preset threshold value (that is, the count of data packets received by the network element 2 exceeds the preset threshold value, but has not acquired the first identification result yet), sets a reverse identification result carrying flag (the reverse identification result carrying flag here may be a downlink identification result carrying flag) predefined in the local flow table to be true, inserts the identification result request information (the identification result request information may include the identification result in the local flow table) in an IP option field of the data packet, performs adaptive adjustment, and then sends the data packet. Optionally, when the identification result request information is inserted in the IP option field of the data packet, a third identification status code may be further inserted and is used for indicating that the data packet carries the identification result request information for the identification function network element, so as to request the first identification result from the identification function network element.

In an implementation manner of this embodiment, in the case that the local flow table of the spread network element does not save the first identification result, every time a data packet is received, the spread network element parses an extension field of the data packet. If the data packet does not carry the first identification result, or the data packet carries the first identification result while the spread network element fails to save the first identification result in the local flow table, add one unit value to the identification result wait packet count in the local flow table. If an extension field of the header of the data packet carries the first identification result but the spread network element saves the first identification result in the local flow table, reset the identification result wait packet count.

Step 4. A spread network element 3 receives the data packet and performs packet forwarding processing. Specifically, parse the IP option field of the data packet, determine that the data packet carries the identification result request information, and only renew the flow table and perform service processing without performing packet processing. Then, forward the data packet downstream.

Step 5. A spread network element N receives the data packet and performs packet forwarding processing. Specifically, determine that the data packet carries the identification result request information, only renew the flow table and perform service processing, delete the identification result request information in the data packet, and perform adaptive adjustment. Then, send the data packet.

Step 6. The spread network element N receives a response packet, renews the flow table, and performs relevant service processing. Then, forward the response packet.

Step 7. Please refer to step 6.

Step 8. After receiving the response packet, the network element 2 determines that the identification result wait packet count exceeds the threshold value and the reverse identification result flag is true, inserts the identification result request information in the IP option field of the response packet, performs adaptive adjustment (the identification result request information may include the identification result in the local flow table), at the same time sets the reverse identification result carrying flag to be false, resets the identification result wait packet count, and then sends the response packet. Optionally, when the identification result request information is inserted in the IP option field of the response packet, a third identification status code may be further inserted and is used for indicating that the response packet carries the identification result request information for the identification function network element, so as to request the first identification result from the identification function network element.

Step 9 and step 10: The identification function network element deletes the insertion information in the response packet that carries the identification result request information and sends the response packet downstream, and inserts the first identification result in an IP option field of a next received data packet and forwards the data packet. Specifically:

Step 9. The identification function network element 1 receives the response packet and performs packet forwarding processing. Specifically, parse the IP option field of the response packet, determine that the identification result request information sent by spread network element is included, set the reverse identification result carrying flag (the reverse identification result carrying flag here may be an uplink identification result carrying flag) predefined in the local flow table to be true, delete the insertion information in the response packet, perform adaptive adjustment, renew the flow table, perform relevant service processing, and then send the response packet.

Step 10. The identification function network element 1 receives the data packet and performs packet forwarding processing. Specifically, determine that the reverse identification result carrying flag is true, insert the first identification result in the IP option field of the data packet, and perform adaptive adjustment. Set the reverse identification result carrying flag to be false, renew the flow table, perform relevant service processing, and then send the data packet.

Step 11. The spread network element 2 receives the data packet and performs packet forwarding processing. Specifically, parse the IP option field of the data packet and save the first identification result in the local flow table. Renew the flow table, perform relevant service processing, and then send the data packet.

Step 12 and step 13: Please refer to step 11. However, in step 13, the spread network element N can delete the insertion information in the data packet, perform adaptive adjustment, and then send the data packet to a server/user.

In the embodiment of the present invention, if the spread network element is faulty in a process of forwarding uplink data and the faulty network element is an upstream network element of the identification function network element in the uplink direction, the faulty network element can insert the identification result request information in a data packet in the uplink direction, so that the identification function network element executes corresponding operations according to the predefined reverse identification result carrying flag and the first identification result saved in the local flow table.

In another embodiment of the present invention, if a spread network element is faulty in a process of forwarding downlink data and the failure network element is an upstream network element of the identification function network element in the downlink direction, the faulty network element can insert the identification result request information in a response packet in the downlink direction, so that the identification function network element executes corresponding operations according to the predefined reverse identification result carrying flag and the first identification result saved in the local flow table.

It should be noted that the default value of the reverse identification result carrying flag provided in the embodiments of the present invention is false, and the packet forwarding is not affected. Optionally, the reverse identification result carrying flag may be a flag defined in the local flow table. When it is set to be true, it indicates that the opposite direction packet of the current direction needs to carry the corresponding insertion information.

FIG. 8A is a schematic diagram of a format of an option field of an IPv4 packet header according to an embodiment of the present invention. FIG. 8B is a schematic diagram of a format of an extension header field of an IPv6 packet header according to an embodiment of the present invention.

Referring to FIG. 8A, the IPv4 header provides the capability of carrying extension information for an IP header through an option (OPTION) field. Each hop needs to process the OPTION field. The following content is defined in the OPTION field in this embodiment.

Option type is defined to be 00011110. The leftmost bit represents whether to copy the option in all IP fragments, which, when set to 0, represents not to copy, and only the first fragment needs to carry identification information. The second and third bits from left to right are 00, representing that the option belongs to a control type message. The following five bits 11110 is an option number (option number), an IP protocol stack determines the option type through the field, 11110 serves as the option number reserved previously, and can be used to mark that the option is identification result carrying information in this technical solution. If the option number field of a packet is 11110, a network element that needs to acquire the identification result, for example, an identification function network element or a spread network element, parses the Option field of the packet, and other devices that do not support the option can ignore the option and continue to forward the packet.

Option length content is the length of the entire option.

The identification status code has 4 bits. The leftmost bit is an identification first packet flag, which, when set to 1, marks the first data packet for identification in the current IP network traffic, and is used for a non-identification function network element to determine whether the identification function network element needs to acquire identification results from other network elements. For the last 3 bits on the right, 000 may serve as a first identification status code or a fourth identification status code, which is used for the identification function network element to spread the first identification result and/or the second identification result to the spread network element; 001 may serve as a third identification status code to mark the identification result request information and is used for the spread network element to request the first identification result from the identification function network element; 010 may serve as a second identification status code and is used for marking that the option is a response to that the identification function network element requests the first identification result. The rest are reserved.

The identification result includes the identified information such as a protocol, an application, and a terminal type, whose length is related to the structure of the identification result returned by the identification function, and may support carrying a plurality of identification results.

The extension information field may mark strategy information of the current IP network traffic, such as discarding or traffic limiting.

The definitions of the Option type, identification status code, and identification result enable the identification function network element and the spread network element to perform corresponding processing according to different insertion information.

Referring to FIG. 8B, the IPv6 packet header provides the capability of carrying extension information for an IP header through the extension header field. The extension field in this embodiment is inserted in the extension header field of the IPv6 and is implemented by adopting a Hop-by-Hop Options (hop-by-hop option) extended header. The protocol specifies that Hop-by-Hop Options need to be processed on each network element. The extension header field is defined as follows:

Next Header (8 bits) header records information about a next extended header.

Hdr ext len (8 bits) records the length of the Hop-by-Hop Options header.

Option type is defined to be 00011110. The first two bits 00 from left to right represents to skip the option and continue to process a next option if the network element fails to identify the option; the third bit is set to be 0, representing not to modify the content of the option in the forwarding process; the last five bits 11110 are the option number, an IP protocol stack determines the option type through the field, and 11110 serves as the option number reserved previously, and is used for marking that the option is the identification result carrying information in this technical solution. If the option number field of a packet is 11110, a device that needs to acquire the identification result, for example, an identification function network element or a spread network element, parses the Option field of the packet, and other devices can ignore the option field and continue to forward the packet.

For the description of the Option length, identification status code, identification result, and extension information field, please refer to the description in FIG. 8A, which are not described herein again. The definitions of the Option type, identification status code, and identification result enable the identification function network element and the spread network element to perform corresponding processing according to different insertion information.

In various method embodiments provided in the present invention, as discussed above, for a packet that carries insertion information, some identification function network element or spread network element can select to delete the insertion information from the packet and send the packet, or maintain the insertion information in the packet and send the packet. Such selectivity can be implemented by defining a network element attribute. Such a definition is also applicable to the apparatus embodiments provided in the present invention. For example, the identification function network element or spread network element is defined as an uplink edge node, a downlink edge node, an uplink terminating node, or a downlink terminating node to determine a range to spread the identification result, in which:

Uplink edge node: Forbid an uplink packet to carry insertion information in this solution, a packet of this type is directly discarded upon reception, and when a threshold value is exceeded, a protective measure is adopted to prevent attacks. However, a packet that carries insertion information is sent to the uplink and downlink.

Downlink edge node: Forbid a downlink packet to carry insertion information in this solution, a packet of this type is directly discarded upon reception, and when a threshold value is exceeded, and a protective measure is adopted to prevent attacks. However, a packet that carries insertion information is sent to the uplink and downlink.

Uplink terminating node: Forbid a downlink packet to carry insertion information in this solution, a packet of this type is directly discarded upon reception, and when a threshold value is exceeded, a protective measure is adopted to prevent attacks. If the extension field of the header of a packet from the uplink direction carries insertion information in this solution, delete the insertion information and forward the packet (for example, strip the extension field of the header of the packet that carries insertion information in this solution and forward the packet). Also, forbid to set an identification result carrying flag in the uplink direction to be true.

Downlink terminating node: Forbid an uplink packet to carry insertion information in this solution, a packet of this type is directly discarded upon reception, and when a threshold value is exceeded, a protective measure is adopted to prevent attacks. If the extension field of a packet from the downlink direction carries insertion information in this solution, delete the insertion information and forward the packet. Also, forbid to set an identification result carrying flag in the downlink direction to be true.

For example, in FIG. 3, the identification function network element 1 may be defined as a downlink edge node, and the spread network element N may be defined as an uplink edge node, so that the network element N sends a data packet carrying the first identification result to a peer user equipment. A node located between the network element 1 and the network element N can perform operations such as parsing and forwarding on a received packet carrying insertion information provided in the present invention. In FIG. 4, the network element 1 may be defined as a downlink terminating node, and the network element N may be defined as an uplink terminating node.

For another example, in all network elements through which one piece of network traffic flows, if one segment of the path thereof is selected for executing a DPI service, network element attributes of a start network element and an end network element of the path can be defined as necessary.

FIG. 9A is a schematic structural diagram of an identification function network element according to an embodiment of the present invention. Referring to FIG. 9A, the identification function network element 90 includes:

a first receiving unit 91, configured to receive a data packet in network traffic;

a first identification unit 92, configured to perform deep packet inspection (DPI) identification on the data packet;

a first processing unit 93, configured to: when the first identification unit 92 successfully identifies the data packet, save a first identification result obtained through identification in a local flow table of the identification function network element, and insert the first identification result in an extension field of the header of the data packet; when the first identification unit fails to identify the data packet, insert a second identification result in the header extension field of the data packet, where the second identification result is an initialization identification result when the identification function network element creates the local flow table; and a first sending unit 94, configured to send the data packet carrying the first identification result or the second identification result to a first downstream device.

Optionally, the first processing unit 93 is further configured to insert a first identification status code in the extension field of the header of the data packet, where the first identification status code is used for indicating that the data packet carries the first identification result or the second identification result for the first downstream device.

Optionally, the network traffic may specifically be IP network traffic. If the data packet is the first data packet that enters the first identification unit for identification in the IP network traffic, the first processing unit 93 is further configured to insert an identification first packet flag in the extension field of the header of the data packet, where the identification first packet flag is used for marking the first data packet that enters the identification function network element for identification in the IP network traffic.

The identification function network element 90 provided in this embodiment inserts identification result information in an extension field of a header of a data packet, so as to send the identification result information to other network element devices, thereby reducing a delay in executing a DPI service in an entire network.

In an implementation manner of the embodiment shown in FIG. 9A, referring to FIG. 9B, an identification function network element 90' may further include:

a sixth receiving unit 95, configured to: after the first sending unit 94 sends the data packet carrying the second identification result to the first downstream device, receive a response packet, where the response packet is generated by a server or user equipment after the server or user equipment receives the data packet, and is forwarded by the first downstream device to the identification function network element 90';

a second identification unit 96, configured to identify the response packet; and a sixth processing unit 97, configured to: after the second identification unit 96 successfully identifies the response packet to acquire the first identification result, save the first identification result in the local flow table, and insert the first identification result in an extension field of a header of a next data packet received by the identification function network element 90', where the next data packet belongs to the IP network traffic.

In this implementation manner, in the case that the first identification unit 92 fails to complete the identification, a corresponding response packet may be identified and the spread of an identification result may be achieved through an extension field of a header of the packet.

Figure 9C:
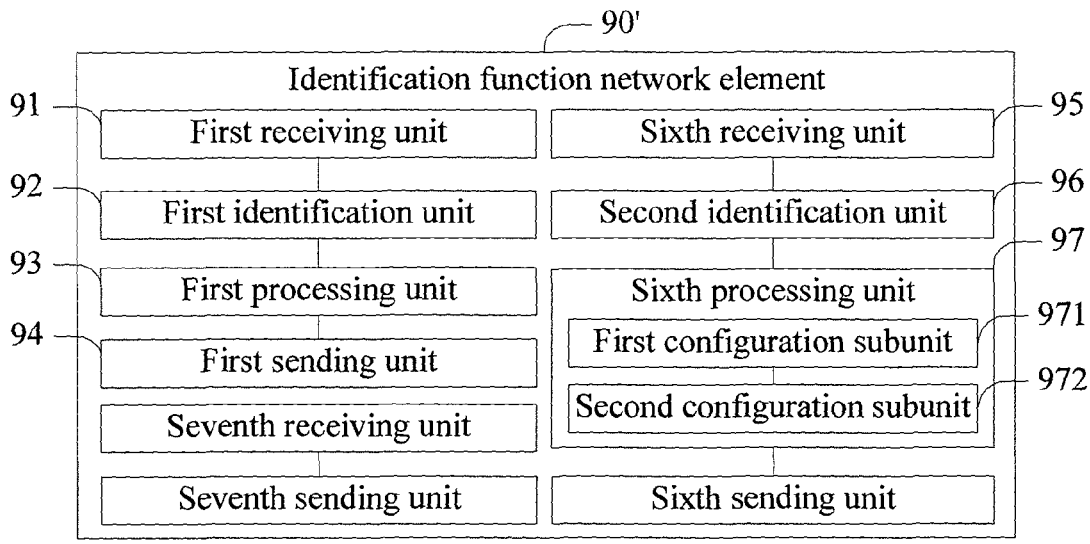
FIG. 9C is a schematic structural diagram of an identification function network element according to an embodiment of the present invention.

Referring to FIG. 9C, the sixth processing unit 97 may include:

a first configuration subunit 971, configured to: configure a third reverse identification result carrying flag in a local flow table of the identification function network element 90', so that the identification function network element 90' determines whether to insert the first identification result in the header extension field of the next data packet according to the third reverse identification result, and configured to: after the second identification unit 96 successfully identifies the response packet, set the third reverse identification result carrying flag to be true; and a second configuration subunit 972, configured to: when a following seventh receiving unit receives the next data packet, determine that the third reverse identification result carrying flag is set to be true, insert the first identification result in the header extension field of the next data packet, set the third reverse identification result carrying flag to be false, and then invoke the following seventh sending unit.

The identification function network element 90' further includes:

a sixth sending unit, configured to: after the first configuration subunit 971 completes configuration, forward the response packet to a second downstream device, or, insert the first identification result in the header extension field of the response packet, and send the response packet to the second downstream device; and a seventh receiving unit, configured to receive the next data packet.

The seventh sending unit is configured to determine according to a service configuration that the next data packet carrying the first identification result does not need to be discarded, and send the next data packet to the first downstream device.

Of course, the functions of the seventh receiving unit and the seventh sending unit may also be implemented by the first receiving unit 91 and the first sending unit 94, respectively.

The identification function network element 90' can identify, in the case of failing to identify a current data packet, a subsequently received response packet, and spread, through an extension field of a header of the packet, a first identification result obtained through the successful identification to other devices, thereby lowering a delay in executing a DPI service in an entire network.

Figure 10:
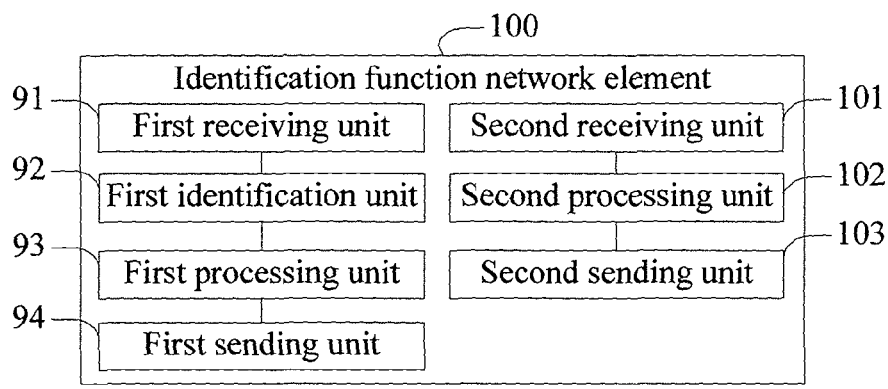
FIG. 10 is a schematic structural diagram of an identification function network element according to an embodiment of the present invention.

FIG. 10 is a schematic structural diagram of an identification function network element according to an embodiment of the present invention. Referring to FIG. 10, an identification function network element 100 may include:

a first receiving unit 91, a first identification unit 92, a first processing unit 93, a first sending unit 94, and a second receiving unit 101, configured to: after the first sending unit 94 sends a data packet carrying a second identification result and an identification first packet flag to a first downstream device, receive a response packet, where the response packet is sent by the first downstream device to the identification function network element 100, the response packet carries a response message, an extension field of a header of the response packet carries the first identification result, the response message is generated by a server or user equipment after the server or user equipment receives the data packet, the response packet is used for informing the identification function network element of the first identification result. Optionally, the extension field of the header of the response packet further carries a second identification status code, which is used for indicating that the response packet carries the first identification result for the identification function network element 100;

a second processing unit 102, configured to parse the response packet to save the first identification result in the local flow table, and delete the first identification result carried in the response packet; and a second sending unit 103, configured to send the response packet processed by the second processing unit to a second downstream device.

The data packet received by the first receiving unit 91 is the first packet for identification in the IP network traffic. The first identification unit 92 does not complete the identification of the data packet. The first processing unit 93 inserts the second identification result and the identification first packet flag in an extension field of the header of the data packet.

In the case that at least one of other devices saves the first identification result, if the first identification result in the local flow table disappears due to a failure or restart of the identification function network element 100, the identification function network element 100 can insert the identification first packet flag and the second identification result in an extension field of a header of the received data packet (which belongs to the IP network traffic), so as to request the first identification result from the device that saves the first identification result without the need of identifying a packet again, thereby avoiding the possible problem of failing to complete identification for IP network traffic for which a part of data interactions have been completed.

Figure 11:
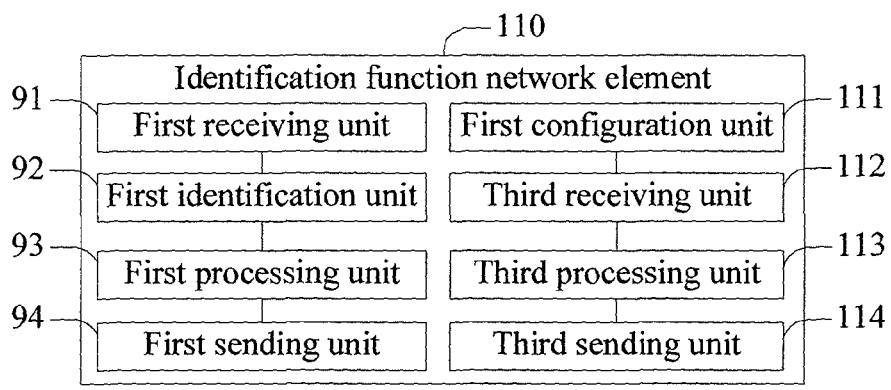
FIG. 11 is a schematic structural diagram of an identification function network element according to an embodiment of the present invention.

FIG. 11 is a schematic structural diagram of an identification function network element according to an embodiment of the present invention. Referring to FIG. 11, an identification function network element 110 may include:

a first receiving unit 91, a first identification unit 92, a first processing unit 93, a first sending unit 94, and a first configuration unit 111, configured to configure a first reverse identification result carrying flag in a local flow table, and when the first identification unit 92 successfully identifies a data packet, set the first reverse identification result carrying flag to be true, when the following third processing unit 113 completes packet processing, set the first reverse identification result carrying flag to be false, where the first reverse identification result carrying flag is used for indicating whether the first identification result is inserted in an extension field of a header of a received response packet, and the response packet is generated by a server or user equipment after the server or user equipment receives the data packet, and is forwarded by the first downstream device to the identification function network element;

a third receiving unit 112, configured to: after the first sending unit 94 sends the data packet carrying the first identification result to the first downstream device, receive the response packet;

a third processing unit 113, configured to: when the third receiving unit 112 receives the response packet, determine whether the first reverse identification result carrying flag is true, and if it is true, insert the first identification result in the header extension field of the response packet, or insert the first identification result and a fourth identification status code in the extension field of the header of the response packet, where the fourth identification status code is used for indicating that the response packet carries the first identification result for the second downstream device; and a third sending unit 114, which is used for sending the response packet processed by the third processing unit 113 to the second downstream device.

The first identification unit 92 completes the identification of the data packet.

Figure 12:
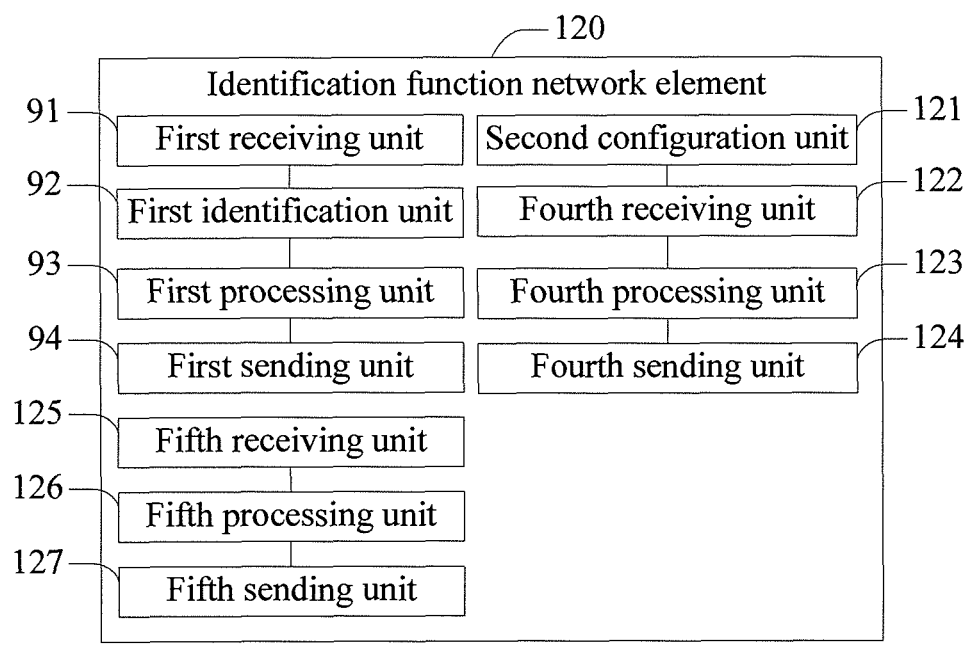
FIG. 12 is a schematic structural diagram of an identification function network element according to an embodiment of the present invention.

FIG. 12 is a schematic structural diagram of an identification function network element according to an embodiment of the present invention. Referring to FIG. 12, an identification function network element 120 may include:

a first receiving unit 91, a first identification unit 92, a first processing unit 93, a first sending unit 94, and a second configuration unit 121, configured to configure a second reverse identification result carrying flag in a local flow table, and when a fourth receiving unit receives a response packet, set the second reverse identification result carrying flag to be true, where the second reverse identification result carrying flag is used for instructing the identification function network element 120 whether to insert the first identification result in an extension field of a header of a next data packet received by the identification function network element; and configured to: when the following fourth receiving unit 122 receives a response packet, set the second reverse identification result carrying flag to be true, and when a following fifth processing unit 126 completes processing of the next data packet, set the second reverse identification result carrying flag to be false, where the next data packet is a next data packet received after the identification function network element receives the data packet, and the next data packet belongs to the network traffic;

the fourth receiving unit 122, configured to: after the first sending unit 94 sends the data packet carrying the first identification result to the first downstream device, receive the response packet, where the response packet is sent by the first downstream device to the identification function network element 120, the response packet carries a response message, the extension field of the header of the response packet carries identification result request information, the response message is generated by a server or user equipment after the server or user equipment receives the data packet or a subsequent data packet of the IP network traffic, and the identification result request information is used for requesting the first identification result from the identification function network element 120;

a fourth processing unit 123, configured to delete the identification result request information carried in the response packet;

a fourth sending unit 124, configured to send the response packet processed by the fourth processing unit 123 to a second downstream device;

a fifth receiving unit 125, configured to receive the next data packet, where the next data packet is a next data packet received after the identification function network element receives the data packet, and the next data packet belongs to the network traffic;

a fifth processing unit 126, configured to determine whether the second reverse identification result carrying flag is true, and if it is true, insert the first identification result in the header extension field of the next data packet; and a fifth sending unit 127, configured to: when it is determined according to a service configuration that the next data packet carrying the first identification result does not need to be discarded, send the next data packet to the first downstream device.

Of course, the functions of the fifth receiving unit 125 and the fifth sending unit 127 may also be implemented by the first receiving unit 91 and the first sending unit 94, respectively.

Figure 13A:
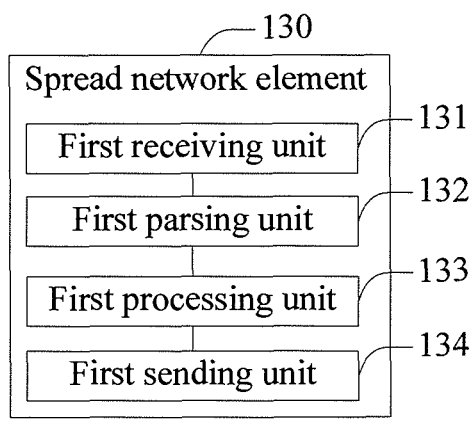
FIG. 13A is a schematic structural diagram of a spread network element according to an embodiment of the present invention.

FIG. 13A is a schematic structural diagram of a spread network element according to an embodiment of the present invention. Referring to FIG. 13A, a spread network element 130 includes:

a first receiving unit 131, configured to receive a data packet in IP network traffic;

a first parsing unit 132, configured to parse an extension field of the header of the data packet to determine insertion information carried in the extension field of the header of the data packet;

a first processing unit 133, configured to manage a local flow table of the spread network element 130 according to the insertion information; and a first sending unit 134, configured to: when it is determined according to a service configuration that the data packet does not need to be discarded, perform packet forwarding processing, which includes: sending the data packet to a first downstream device, so that the first downstream device manages a flow table according to the insertion information, or deleting the insertion information carried in the data packet, and sending the data packet to the first downstream device.

A person skilled in the art should understand that if the service configuration is blocking or traffic limiting that causes that the data packet is discarded, the packet forwarding processing cannot be performed.

The spread network element 130 provided in this embodiment can parse an extension field of a header of a data packet, so as to perform corresponding processing according to insertion information to acquire or spread identification result information.

Figure 13B:
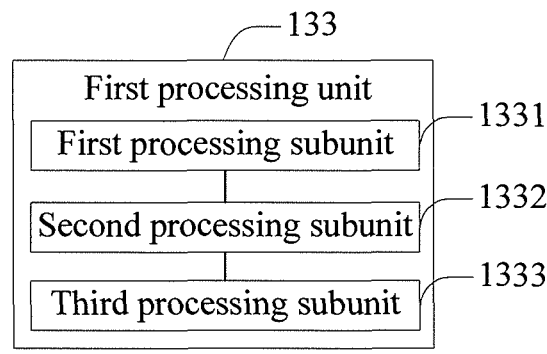
FIG. 13B is a schematic structural diagram of a first processing unit of a spread network element according to an embodiment of the present invention.

In an implementation manner of this embodiment, referring to FIG. 13B:

A first processing unit 133 includes: a first processing subunit 1331, and/or a second processing subunit 1332, and/or a third processing subunit 1333.

A first processing subunit 1331 is configured to: when the insertion information includes a first identification result, or, includes a first identification result and a first identification status code, save the first identification result in a local flow table.

A second processing subunit 1332 is configured to: when the insertion information includes a second identification result, or, includes a second identification result and a first identification status code, create or renew the local flow table without saving the second identification result.

A third processing subunit 1333 is configured to: when the insertion information includes identification result request information, or, includes identification result request information and a third identification status code, create or renew the local flow table.

The first identification result is an identification result when deep packet inspection identification is successfully completed for the data packet, the second identification result is an initialization identification result when the spread network element 130 creates the local flow table, the first identification status code is used for indicating that the data packet carries the first identification result or the second identification result for the spread network element 130, the third identification status code is used for indicating that the data packet carries the identification result request information for the second downstream device, and the identification result request information is used for requesting the first identification result from the second downstream device.

Further optionally, when the insertion information includes the first identification result or the second identification result, the insertion information further includes: an identification first packet flag, which is used for marking the first data packet for deep packet inspection identification in the IP network traffic.

The spread network element 130 provided in this embodiment does not have to identify a data packet, but only needs to parse an extension field of the header of the data packet, so as to acquire or spread the identification result according to the insertion information carried in the data packet, thereby reducing a delay in executing a DPI service in an existing network and lowering a maintenance cost.

At least one identification function network element 90 (or identification function network element 90') and at least one spread network element 130 can form one identification result spread system, which is configured to execute a DPI service. In the system, only the identification function network element 90 performs packet identification, and spreads the identification result to the spread network element 130 by using an extension field of a header of a packet, thereby reducing a delay in executing a DPI service in an existing network and lowering a maintenance cost.

Figure 14:
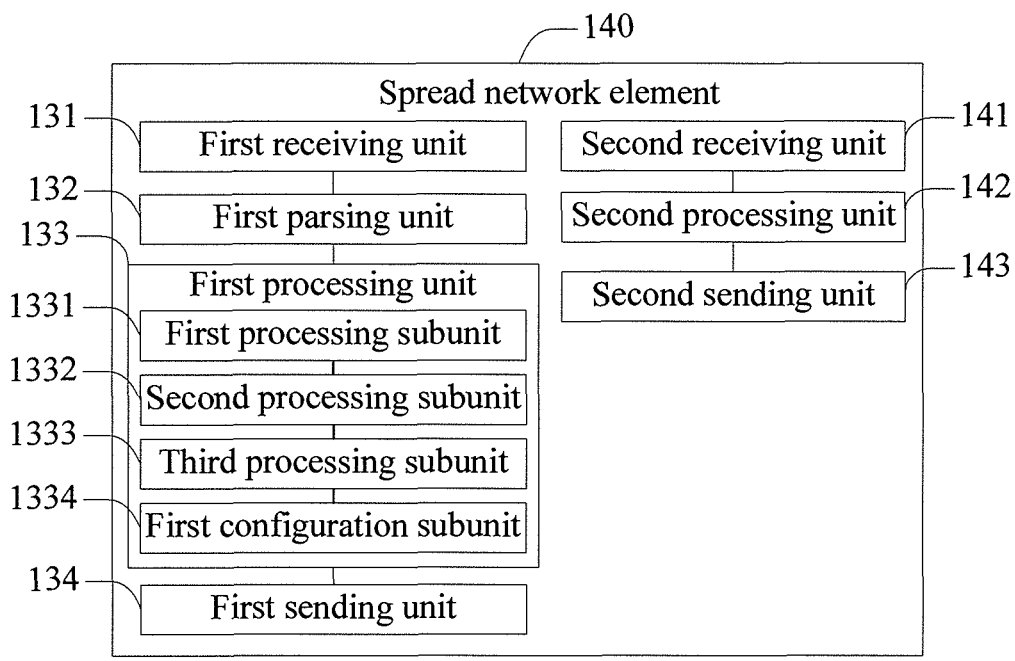
FIG. 14 is a schematic structural diagram of a spread network element and a first processing unit thereof according to an embodiment of the present invention.

FIG. 14 is a schematic structural diagram of a spread network element according to an embodiment of the present invention. Referring to FIG. 14, a spread network element 140 includes: a first receiving unit 131, a first parsing unit 132, a first processing unit 133, a first sending unit 134, a second receiving unit 141, a second processing unit 142, and a second sending unit 143.

The first processing unit 133 further includes a first configuration subunit 1334, configured to configure a fourth reverse identification result carrying flag in a local flow table, so that the spread network element 140 determines whether to inform a second downstream device of a first identification result according to the fourth reverse identification result carrying flag; and configured to: when insertion information includes a second identification result and an identification first packet flag, and the local flow table saves the first identification result, set the fourth reverse identification result carrying flag to be true, and after the following second processing unit 142 completes packet processing, set the fourth reverse identification result carrying flag to be false.

The second receiving unit 141 is configured to: after the first sending unit 134 performs packet forwarding processing, receive a response packet, where the response packet is generated by a server or user equipment after the server or user equipment receives the data packet, and the first downstream device forwards the response packet to the spread network element 130.

The second processing unit 142 is configured to determine that the fourth reverse identification result carrying flag is true, and insert the first identification result in an extension field of a header of the response packet.

Optionally, the second processing unit 142 is further configured to: when the first identification result is inserted in the extension field of the header of the response packet, insert a second identification status code in the extension field of the header of the response packet, so as to indicate that the response packet carries the first identification result for the second downstream device.

The second sending unit 143 is configured to send the response packet processed by the second processing unit 142 to the second downstream device, so as to inform the second downstream device of the first identification result.

The spread network element 140 provided in this embodiment can inform, in the case that an identification function network element is restarted or faulty, the identification function network element of the first identification result, thereby avoiding the problem that the identification function network element fails to identify a subsequent data packet and therefore fails to acquire the first identification result.

Figure 15:
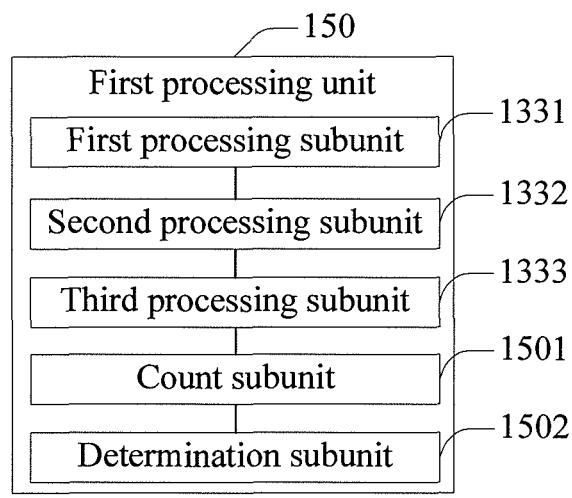
FIG. 15 is another schematic structural diagram of the first processing unit in the embodiment shown in FIG. 13B.

FIG. 15 is a schematic structural diagram of the first processing unit in the embodiment shown in FIG. 13B. Referring to FIG. 15, a first processing unit 150 includes: a first processing subunit 1331, a second processing subunit 1332, a third processing subunit 1333, a count subunit 1501, and a determination subunit 1502.

The count subunit 1501 is configured to calculate an identification result wait packet count, where the identification result wait packet count represents the number of data packets received before the spread network element 130 acquires the first identification result.

The determination subunit 1502 is configured to: in the case that the local flow table does not save the first identification result, if the insertion information does not include the first identification result, or the insertion information includes the first identification result but does not save the first identification result in the local flow table, determine whether the identification result wait packet count exceeds a preset threshold value, and if the identification result wait packet count exceeds the preset threshold value, trigger the spread network element 130 to request the first identification result from the second downstream device.

Figure 16:
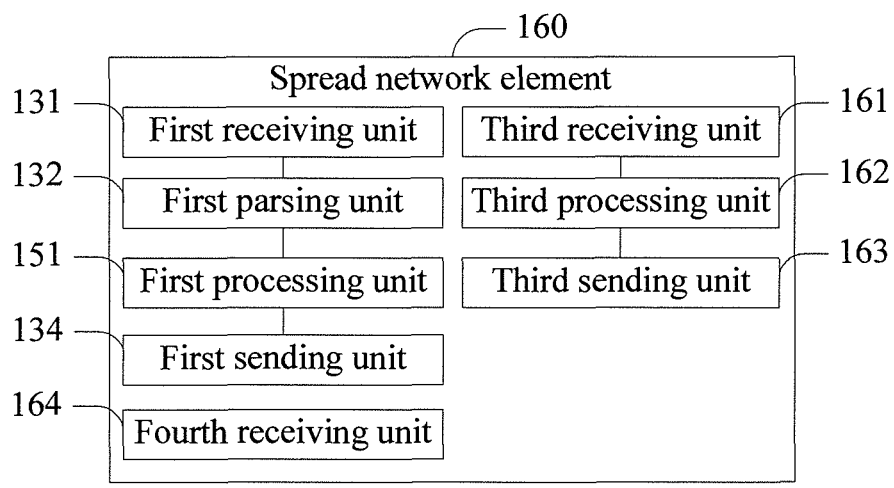
FIG. 16 is a schematic structural diagram of a spread network element according to an embodiment of the present invention.

Optionally, referring to FIG. 16, FIG. 16 is a schematic structural diagram of a spread network element according to an embodiment of the present invention. Referring to FIG. 16, a spread network element 160 includes: a first receiving unit 131, a first parsing unit 132, a first processing unit 151, a first sending unit 134, a third receiving unit 161, a third processing unit 162, a third sending unit 163, and a fourth receiving unit 164.

The first processing unit 151 includes all the parts of the first processing unit 150, and further includes a second configuration subunit, configured to configure a fifth reverse identification result carrying flag in a local flow table, so that the spread network element 160 determines whether to request a first identification result from a second downstream device according to the fifth reverse identification result carrying flag; and configured to: when a identification result wait packet count exceeds a preset threshold value, set the fifth reverse identification result carrying flag to be true, after the following third processing unit 162 completes packet processing, set the fifth reverse identification result carrying flag to be false, and reset the identification result wait packet count.

The third receiving unit 161 is configured to: after the first sending unit 134 performs packet forwarding processing, receive a response packet, where the response packet is generated by a server or user equipment after the server or user equipment receives the data packet, and a first downstream device forwards the response packet to the spread network element 160.

The third processing unit 162 is configured to determine that the fifth reverse identification result carrying flag is true, and insert identification result request information in an extension field of a header of the response packet.

The third sending unit 163 is configured to send the response packet processed by the third processing unit 162 to the second downstream device, so as to request the first identification result from the second downstream device, so that after receiving the response packet carrying the identification result request information and when receiving a next data packet that belongs to the IP network traffic, the second downstream device inserts the first identification result in an extension field of a header of the next data packet and sends the next data packet to the spread network element 160.

The fourth receiving unit 164 is configured to receive the next data packet, perform parsing, and save the first identification result in the local flow table, so as to acquire the first identification result.

Upon reception of data packets for a preset number of times, if the first identification result is still not acquired, the spread network element 160 provided in this embodiment can automatically request the first identification result from the identification function network element, so as to avoid loss of the first identification result due to a failure or restart of the spread network element 160.

Figure 17:
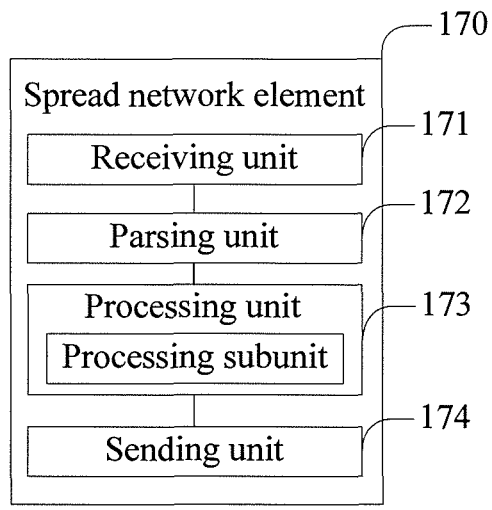
FIG. 17 is a schematic structural diagram of a spread network element according to an embodiment of the present invention.

FIG. 17 is a schematic structural diagram of a spread network element according to an embodiment of the present invention. Referring to FIG. 17, a spread network element 170 includes:

a receiving unit 171, configured to receive a response packet, where the response packet is sent by a first downstream device to the spread network element 170, the response packet carries response information, an extension field of a header of the response packet carries insertion information, and the response information is generated by a server or user equipment after the server or user equipment receives a data packet in IP network traffic;

a parsing unit 172, configured to parse the extension field of the header of the response packet to determine the insertion information carried in the extension field of the header of the response packet;

a processing unit 173, configured to manage a local flow table of the spread network element 170 according to the insertion information; and a sending unit 174, configured to send the response packet to a second downstream device, so that the second downstream device manages a flow table according to the insertion information, or delete the insertion information carried in the response packet and send the response packet to the second downstream device.

Optionally, in an implementation manner of this embodiment, the processing unit 173 includes: a processing subunit, configured to: when the insertion information includes a first identification result and a fourth identification status code, save the first identification result in the local flow table, where the first identification result is an identification result when deep packet inspection identification is successfully performed on the IP network traffic, and the fourth identification status code is used for indicating that the response packet carries the first identification result for the spread network element 170.

The spread network element 170 provided in this embodiment can parse the received response packet, and save the first identification result carried in the extension field of the header of the response packet in the local flow table to acquire the first identification result.

A person skilled in the art should understand that the spread network element 170 may also have the structures and functions of the spread network elements shown in FIG. 13 to FIG. 16, which is not elaborated here in the present invention.

Figure 18:
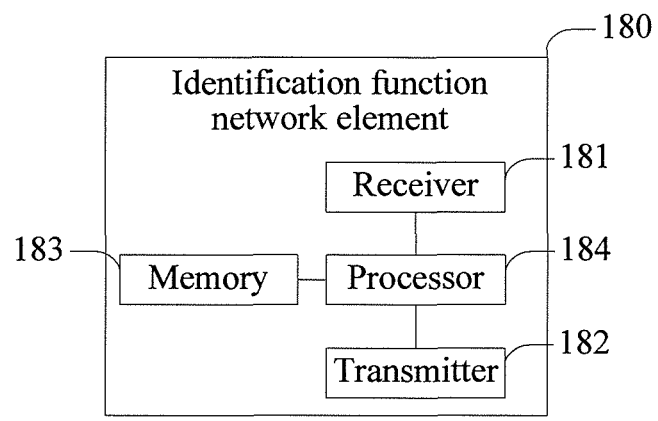
FIG. 18 is a schematic structural diagram of an identification function network element according to an embodiment of the present invention.

FIG. 18 is a schematic structural diagram of an identification function network element according to an embodiment of the present invention. Referring to FIG. 18, an identification function network element 180 includes: a receiver 181, a transmitter 182, a memory 183, and a processor 184 connected to the receiver 181, the transmitter 182, and the memory 183, respectively.

The memory 183 stores various data, programs, and applications, which are to be invoked by the processor 184 to implement the following functions:

The processor 184 receives a data packet in IP network traffic through the receiver 181.

Identify the data packet; if the data packet is successfully identified, save a first identification result obtained through identification in a local flow table of the identification function network element, and insert the first identification result in an extension field of the header of the data packet, if the data packet fails to be identified, insert a second identification result in the header extension field of the data packet, where the second identification result is an initialization identification result when the identification function network element 180 creates the local flow table.

When it is determined according to a service configuration that the data packet does not need to be discarded, the transmitter 182 sends the data packet carrying the first identification result or the second identification result to a first downstream device.

Optionally, the memory 183 stores the local flow table of the identification function network element 180.

Optionally, the data packet includes: an IPv4 packet or an IPv6 packet. When the data packet is an IPv4 packet, the extension field of the header is an option field of the IPv4 packet header. When the data packet is an IPv6 packet, the extension field of the header is an extension header field of the IPv6 packet header.

Optionally, the extension field of the header of the data packet further includes a first identification status code, which is used for indicating that the data packet carries the first identification result or the second identification result for the first downstream device.

Optionally, if the data packet is the first data packet that enters the identification function network element for identification in the IP network traffic, when the data packet is successfully identified or fails to be identified, insert an identification first packet flag in the extension field of the header of the data packet, where the identification first packet flag is used for marking the first data packet that enters the identification function network element for identification in the IP network traffic.

Further optionally, after the transmitter 182 sends the data packet carrying the second identification result and the identification first packet flag to the first downstream device, in an implementation manner of this embodiment, the processor 184 is further configured to:

receive a response packet through the receiver 181, where the response packet is sent by the first downstream device to the identification function network element, the response packet carries a response message, an extension field of a header of the response packet carries the first identification result, the response message is generated by a server or user equipment after the server or user equipment receives the data packet, and the response packet is used for informing the identification function network element of the first identification result;

parse the response packet to save the first identification result in the local flow table; and delete the first identification result carried in the response packet and send the response packet to a second downstream device.

Optionally, the extension field of the header of the response packet further includes a second identification status code, which is used for indicating that the response packet carries the first identification result for the identification function network element 180.

Optionally, in an implementation manner of this embodiment, a first reverse identification result carrying flag is set in the local flow table of the identification function network element 180 and is used for the identification function network element 180 to determine whether to insert the first identification result in an extension field of a header of a subsequently received response packet according to the first reverse identification result carrying flag, where the response packet is generated by a server or user equipment after the server or user equipment receives the data packet, and is forwarded by the first downstream device to the identification function network element 180, and the first reverse identification result carrying flag is set to be true when the identification function network element 180 successfully identifies the data packet.

After the transmitter 182 sends the data packet carrying the first identification result to the first downstream device, the processor 184 is further configured to:

receive the response packet through the receiver 181;

determine that the first reverse identification result carrying flag is true, insert the first identification result in the extension field of the header of the response packet, set the first reverse identification result carrying flag to be false, and then send a response packet carrying the first identification result to the second downstream device through the transmitter 182. Optionally, when the first identification result is inserted in the extension field of the header of the response packet, a fourth identification status code is further inserted in the extension field of the header of the response packet and is used for indicating that the response packet carries the first identification result for the second downstream device.

Optionally, in an implementation manner of this embodiment, a second reverse identification result carrying flag is set in the local flow table of the identification function network element 180 and is used for the identification function network element 180 to determine whether to insert the first identification result in an extension field of a header of a subsequently received next data packet according to the second reverse identification result carrying flag, where the next data packet belongs to the IP network traffic;

After the transmitter 182 sends the data packet carrying the first identification result to the first downstream device, the processor 184 is further configured to:

receive a response packet through the receiver 181, where the response packet is sent by the first downstream device to the identification function network element, the response packet carries a response message, the extension field of the header of the response packet carries identification result request information, the response message is generated by a server or user equipment after the server or user equipment receives the data packet or a subsequent data packet of the IP network traffic, and the identification result request information is used for requesting the first identification result from the identification function network element 180;

parse the response packet, find that the extension field of the header of the response packet carries the identification result request information, set the second reverse identification result carrying flag to be true, delete the identification result request information carried in the response packet, and send the response packet to a second downstream device through the transmitter 182, where the extension field of the header of the response packet further includes a third identification status code, which is used for indicating that the response packet carries the identification result request information for the identification function network element 180; and receive the next data packet through the receiver 181, determine that the second reverse identification result carrying flag is true, set the second reverse identification result carrying flag to be false, insert the first identification result in an extension field of a header of the next data packet, and then, when it is determined according to a service configuration that the next data packet carrying the first identification result does not need to be discarded, send the next data packet to the first downstream device through the transmitter 182.

Optionally, in an implementation manner of this embodiment, in the case that the processor 184 fails to identify the data packet, after the transmitter 182 sends the data packet carrying the second identification result to the first downstream device, the processor 184 is further configured to:

receive a response packet through the receiver 181, where the response packet is generated by a server or user equipment after the server or user equipment receives the data packet, and is forwarded by the first downstream device to the identification function network element 180;

identify the response packet, if the response packet is successfully identified to acquire the first identification result, save the first identification result in the local flow table, and insert the first identification result in an extension field of a header of a next data packet received by the identification function network element, where the next data packet belongs to the IP network traffic; and if the response packet fails to be identified, identify the next data packet.

Further optionally, a third reverse identification result carrying flag is set in the local flow table of the identification function network element 180 and is used for the identification function network element 180 to determine whether to insert the first identification result in the header extension field of the next data packet according to the third reverse identification result. The processor 184 inserts the first identification result in the header extension field of the next data packet received by the identification function network element in the following manner:

when the processor 184 successfully identifies the response packet, setting the third reverse identification result carrying flag to be true;

forwarding the response packet to the second downstream device through the transmitter 182, or inserting the first identification result in the header extension field of the response packet, and then sending the response packet to the second downstream device through the transmitter 182; optionally, when the first identification result is inserted in the extension field of the header of the response packet, further inserting a fourth identification status code in the extension field of the header of the response packet, where the fourth identification status code is used for indicating that the response packet carries the first identification result for the second downstream device; and receiving the next data packet through the receiver 181, determining that the third reverse identification result carrying flag is true, inserting the first identification result in the header extension field of the next data packet, setting the third reverse identification result carrying flag to be false, and when it is determined according to a service configuration that the next data packet carrying the first identification result does not need to be discarded, sending the next data packet to the first downstream device through the transmitter 182.

Figure 19:
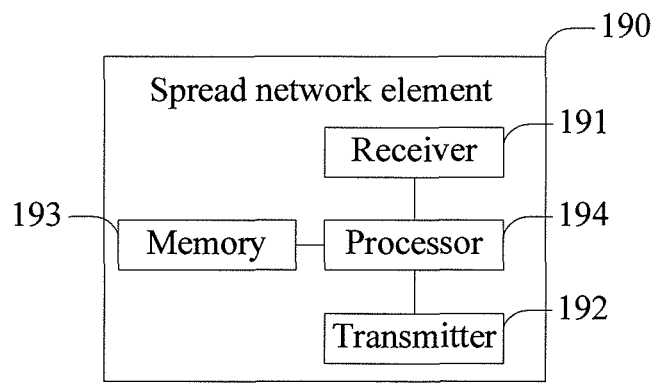
FIG. 19 is a schematic structural diagram of a spread network element according to an embodiment of the present invention.

FIG. 19 is a schematic structural diagram of an identification function network element according to an embodiment of the present invention. Referring to FIG. 19, an identification function network element 190 includes: a receiver 191, a transmitter 192, a memory 193, and a processor 194 connected to the receiver 191, the transmitter 192, and the memory 193, respectively.

The memory 193 stores various data, programs, and applications, which are to be invoked by the processor 194 to implement the following functions:

The processor 194 receives a data packet in IP network traffic through the receiver 191.

Parse an extension field of the header of the data packet to determine insertion information carried in the header extension field of the data packet.

Perform packet forwarding processing according to the insertion information.

When it is determined according to a service configuration that the data packet does not need to be discarded, perform packet forwarding processing, which includes: sending the data packet to a first downstream device through the transmitter 192, so that the first downstream device manages a flow table according to the insertion information, or deleting the insertion information carried in the data packet, and send the data packet that does not carry the insertion information to the first downstream device through the transmitter 192.

Optionally, the memory 193 stores a local flow table of the spread network element 190.

Optionally, the data packet includes: an IPv4 packet or an IPv6 packet. When the data packet is an IPv4 packet, the extension field of the header is an option field of the IPv4 packet header. When the data packet is an IPv6 packet, the extension field of the header is an extension header field of the IPv6 packet header.

Optionally, that the processor 194 manages a local flow table of the spread network element according to the insertion information includes:

if the insertion information includes a first identification result, or, includes the first identification result and a first identification status code, saving the first identification result in the local flow table;

if the insertion information includes a second identification result, or, includes the second identification result and the first identification status code, create or renew the local flow table without saving the second identification result; and if the insertion information includes identification result request information, or, includes the identification result request information and a third identification status code, create or renew the local flow table;

where the first identification result is an identification result when deep packet inspection identification is successfully completed for the data packet, the second identification result is an initialization identification result when the spread network element 190 creates the local flow table, the first identification status code is used for indicating that the data packet carries the first identification result or the second identification result for the spread network element 190, the third identification status code is used for indicating that the data packet carries the identification result request information for a second downstream device, and the identification result request information is used for requesting the first identification result from the second downstream device.

Optionally, when the insertion information includes the first identification result or the second identification result, the insertion information further includes: an identification first packet flag, which is used for marking the first data packet for deep packet inspection identification in the IP network traffic.

Further optionally, the processor 194 is further configured to:

configure a fourth reverse identification result carrying flag in the local flow table, where the fourth reverse identification result carrying flag is used for the spread network element to determine whether to inform the second downstream device of the first identification result according to the fourth reverse identification result carrying flag;

when the insertion information includes the identification first packet flag and the second identification result, determine whether the local flow table saves the first identification result, and if the local flow table saves the first identification result, set the fourth reverse identification result carrying flag to be true;

after packet forwarding processing is performed, receive a response packet through the receiver 191, where the response packet is generated by a server or user equipment after the server or user equipment receives the data packet, and is forwarded by the first downstream device to the spread network element 190;

determine that the fourth reverse identification result carrying flag is true, insert the first identification result in the extension field of the header of the response packet, set the fourth reverse identification result carrying flag set to be false; optionally, when the first identification result is inserted in the extension field of the header of the response packet, further insert a second identification status code in the extension field of the header of the response packet, so as to indicate that the response packet carries the first identification result for the second downstream device; and send a response packet carrying the first identification result to the second downstream device through the transmitter 192, so as to inform the second downstream device of the first identification result.

Optionally, in an implementation manner of this embodiment, the processor 194 is further configured to:

set an identification result wait packet count in the local flow table, where the identification result wait packet count is used for calculating the number of data packets received before the spread network element acquires the first identification result; and in the case that the local flow table does not save the first identification result, if the insertion information does not include the first identification result, or the insertion information includes the first identification result but does not save the first identification result in the local flow table, determine whether the identification result wait packet count exceeds a preset threshold value, and if the identification result wait packet count exceeds the preset threshold value, request the first identification result from the second downstream device.

Further optionally, the processor 194 is further configured to:

configure a fifth reverse identification result carrying flag in the local flow table, where the fifth reverse identification result carrying flag is used for the spread network element 190 to determine whether to request the first identification result from the second downstream device according to the fifth reverse identification result carrying flag, and when it is determined that the identification result wait packet count exceeds the preset threshold value, set the fifth reverse identification result carrying flag to be true.

After performing the packet forwarding processing, the processor 194 is further configured to:

receive a response packet through the receiver 191, where the response packet is generated by a server or user equipment after the server or user equipment receives the data packet, and is forwarded by the first downstream device to the spread network element 190;

determine that the fifth reverse identification result carrying flag is true, insert the identification result request information in the extension field of the header of the response packet, set the fifth reverse identification result carrying flag to be false, and reset the identification result wait packet count;

send the response packet carrying the identification result request information to the second downstream device through the transmitter 192, so as to request the first identification result from the second downstream device, so that the second downstream device, after receiving the response packet carrying the identification result request information, when receiving a next data packet that belongs to the IP network traffic, insert the first identification result in an extension field of a header of the next data packet, and then send the next data packet to the spread network element 190; and receive the next data packet through the receiver 191 and perform parsing, and save the first identification result in the local flow table to acquire the first identification result.

Optionally, in an implementation manner of this embodiment, the processor 194 is further configured to:

receive a response packet through the receiver 191, where the response packet is sent by the first downstream device to the spread network element, the response packet carries response information, the extension field of the header of the response packet carries insertion information, and the response information is generated by a server or user equipment after the server or user equipment receives a data packet in IP network traffic;

parse the extension field of the header of the response packet to determine the insertion information carried in the extension field of the header of the response packet;

manage a local flow table of the spread network element according to the insertion information; and send the response packet to the second downstream device through the transmitter 192, so that the second downstream device manages the flow table according to the insertion information, or delete the insertion information carried in the response packet, and send the response packet that does not carry the insertion information to the second downstream device through the transmitter 192.

Further optionally, if the insertion information includes the first identification result and a fourth identification status code, the processor 194 is further configured to: save the first identification result in the local flow table, where the first identification result is an identification result when deep packet inspection identification is successfully performed on the IP network traffic, and the fourth identification status code is used for indicating that the response packet carries the first identification result for the spread network element 190.

Optionally, the processor is further configured to:

receive a response packet whose header extension field carries identification result request information through the receiver 191, or receive a response packet whose header extension field carries the first identification result and the second identification status code; and forward the foregoing received response packet to the second downstream device through the transmitter 192.

An embodiment of the present invention further provides an identification result spread system, which includes any identification function network element in the embodiments shown in FIG. 9A to FIG. 12 and any spread network element in the embodiments shown in FIG. 13A to FIG. 16.

An embodiment of the present invention further provides an identification result spread system, which includes any identification function network element in the embodiments shown in FIG. 9A to FIG. 12, any spread network element in the embodiments shown in FIG. 13A to FIG. 16, and the spread network element shown in FIG. 17.

For the detailed illustration of the identification function network element and the spread network element, please refer to corresponding illustration in the foregoing apparatus embodiments, which are not described herein again.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disc, an optical disc, a read-only memory (Read-Only Memory, ROM), or a random access memory (Random Access Memory, RAM).

The foregoing only provides exemplary embodiments of the present invention rather than to limit the protection scope of the present invention. Any equivalent modifications made without departing from the claims of the present invention shall fall within the protection scope of the present invention.

What is claimed is:

1. A method for spreading a deep packet inspection (DPI) identification result, the method comprising:

receiving, by an identification function network element, a data packet in network traffic;

performing DPI identification on the data packet;

when the data packet is successfully identified, saving a first identification result obtained through identification in a local flow table of the identification function network element, and inserting the first identification result in an extension field of the header of the data packet;

when the data packet fails to be identified, inserting a second identification result in the extension field of the header of the data packet, wherein the second identification result is an initialization identification result produced when the identification function network element creates the local flow table; and sending the data packet carrying the first identification result or the second identification result to a first downstream device.

2. The method according to claim 1, wherein:

the data packet is an IPv4 packet or an IPv6 packet;

when the data packet is an IPv4 packet, inserting the first identification result in an extension field of the header of the data packet comprises: inserting the first identification result in an option field of the data packet header; and when the data packet is an IPv6 packet, inserting the first identification result in an extension field of the header of the data packet comprises: inserting the first identification result in an extension header field of the data packet.

3. The method according to claim 2, wherein the extension field of the header of the data packet further comprises a first identification status code, which is used for indicating whether the data packet carries the first identification result or the second identification result for the first downstream device.

4. The method according to claim 2, wherein when the data packet is the first data packet that enters the identification function network element for identification in the network traffic, after inserting a second identification result in the header extension field of the data packet, the method further comprises:
- inserting an identification first packet flag in the extension field of the header of the data packet, so that the first downstream device sends a response packet carrying the first identification result to the identification function network element after receiving the data packet carrying the identification first packet flag, wherein the response packet further comprises a response message generated by a server or user equipment after the server or user equipment receives the data packet, and the identification first packet flag is used for marking the first data packet that enters the identification function network element for identification in the network traffic;
- receiving and parsing the response packet to acquire the first identification result, and saving the first identification result in the local flow table; and
- deleting the first identification result carried in the response packet and sending the response packet to a second downstream device.

5. The method according to claim 4, wherein the extension field of the header of the response packet further comprises a second identification status code, which is used for indicating that the response packet carries the first identification result for the identification function network element.

6. The method according to claim 1, wherein:
- a first reverse identification result carrying flag is set in the local flow table and is used for indicating whether the first identification result is inserted in the extension field of a header of a received response packet; the first reverse identification result carrying flag is set to be true when the identification function network element successfully identifies the data packet; and
- after sending the data packet carrying the first identification result to a first downstream device, the method further comprises:
  - receiving the response packet sent by the server or user equipment after the server or user equipment receives the data packet, wherein the response packet is forwarded by the first downstream device to the identification function network element, and
  - determining whether the first reverse identification result carrying flag is true, and if it is true, inserting the first identification result in the extension field of the header of the response packet, setting the first reverse identification result carrying flag to be false, and sending the response packet carrying the first identification result to the second downstream device.

7. The method according to claim 1, wherein:
- a second reverse identification result carrying flag is set in the local flow table and is used for instructing the identification function network element whether to insert the first identification result in an extension field of a header of a next data packet received after the data packet is received, wherein the next data packet belongs to the network traffic;
- after sending the data packet carrying the first identification result to a first downstream device, the method further comprises:
  - receiving a response packet, wherein the response packet is sent by the first downstream device to the identification function network element, the response packet carries a response message, an extension field of a header of the response packet carries identification result request information, the response message is generated by the server or user equipment after the server or user equipment receives the data packet, and the identification result request information is used for requesting the first identification result from the identification function network element,
  - parsing the response packet, setting the second reverse identification result carrying flag to be true, deleting the identification result request information carried in the response packet, sending the response packet to a second downstream device, wherein the extension field of the header of the response packet further comprises a third identification status code, which is used for indicating that the response packet carries the identification result request information for the identification function network element, and
  - receiving the next data packet in the network traffic, determining whether the second reverse identification result carrying flag is true, and if it is true, setting the second reverse identification result carrying flag to be false, inserting the first identification result in the extension field of the header of the next data packet, and sending the next data packet to the first downstream device.

8. The method according to claim 1, wherein if the data packet fails to be identified, after sending the data packet carrying the second identification result to a first downstream device, the method further comprises:
- receiving a response packet, wherein the response packet is generated by the server or user equipment after the server or user equipment receives the data packet, and is forwarded by the first downstream device to the identification function network element; and
- identifying the response packet to acquire the first identification result, saving the first identification result in the local flow table, and inserting the first identification result in an extension field of a header of a next data packet received by the identification function network element, wherein the next data packet belongs to the network traffic.

9. The method according to claim 1, wherein inserting the first identification result or the second identification result in the extension field of the header of the data packet includes performing an adaptive adjustment process to adjust at least one of an IP packet header length, an IP packet length, or a checksum of the data packet.

10. A hardware identification function network element, comprising: a receiver, a transmitter, a memory, and a processor; the memory storing computer instructions executable by the processor, wherein the processor is configured to execute the operation instruction so as to:
- receive a data packet in network traffic through the receiver;
- perform deep packet inspection (DPI) identification on the data packet;
- when the data packet is successfully identified, save a first identification result obtained through identification in a local flow table of the identification function network element, and insert the first identification result in an extension field of the header of the data packet,
- when the data packet fails to be identified, insert a second identification result in the header extension field of the data packet, wherein the second identification result is an initialization identification result produced when the identification function network element creates the local flow table; and send the data packet carrying the first identification result or the second identification result to a first downstream device.

11. The network element according to claim 10, wherein the processor is further configured to execute the operation instruction so as to:

insert a first identification status code in the extension field of the header of the data packet, and the first identification status code is used for indicating that the data packet carries the first identification result or the second identification result for the first downstream device.

12. The network element according to claim 10, wherein if the data packet is the first data packet received by the receiver in the network traffic, the processor is further configured to, after inserting a second identification result in the header extension field of the data packet, insert an identification first packet flag in the extension field of the header of the data packet, so that the first downstream device sends a response packet carrying the first identification result to the identification function network element after receiving the data packet carrying the identification first packet flag, wherein the response packet further comprises a response message generated by a server or user equipment after the server or user equipment receives the data packet, and the identification first packet flag is used for marking the first data packet that enters the identification function network element for identification in the network traffic.

13. The network element according to claim 12, wherein, the receiver is further configured to:

receive a response packet, wherein the response packet carries a response message, an extension field of a header of the response packet carries the first identification result, and the response message is generated by the server or user equipment after the server or user equipment receives the data packet;

the processor is further configured to parse the response packet, save the first identification result in the local flow table, and delete the first identification result carried in the response packet; and the transmitter is further configured to send the response packet processed by the second processing unit to a second downstream device.

14. The network element according to claim 10, wherein the processor is further configured to:

configure a first reverse identification result carrying flag in the local flow table, and when successfully identifies the data packet, set the first reverse identification result carrying flag to be true, wherein the first reverse identification result carrying flag is used for indicating whether the first identification result is inserted in an extension field of a header of a received response packet, and the response packet is generated by a server or user equipment after the server or user equipment receives the data packet, and is forwarded by the first downstream device to the identification function network element;

the receiver is further configured to: after the transmitter sends the data packet carrying the first identification result to a first downstream device, receive the response packet;

wherein the processor is further configured to: when the receiver receives the response packet, deter mine whether the first reverse identification result carrying flag is true, and if it is true, insert the first identification result in the extension field of the header of the response packet, and set the first reverse identification result carrying flag to be false; and the transmitter is further configured to send the response packet inserted with the first identification result to a second downstream device.

15. The network element according to claim 10, wherein the processor is further configured to:

configure a second reverse identification result carrying flag in the local flow table, and when the receiver receives a response packet, set the second reverse identification result carrying flag to be true, wherein the second reverse identification result carrying flag is used for indicating whether to insert the first identification result in an extension field of a header of a next data packet received by the receiver;

the receiver is further configured to: after the transmitter sends the data packet carrying the first identification result to the first downstream device, receive a response packet, wherein the response packet is sent by the first downstream device to the identification function network element, the response packet carries a response message, an extension field of a header of the response packet carries identification result request information, the response message is generated by a server or user equipment after the server or user equipment receives the data packet or other data packets of the network traffic, and the identification result request information is used for requesting the first identification result from the identification function network element;

the processor is further configured to delete the identification result request information carried in the response packet;

the transmitter is further configured to send the response packet with the identification result request information being deleted to a second downstream device;

the receiver is further configured to receive a next data packet, wherein the next data packet is a next data packet received after the receiver receives the data packet, and the next data packet belongs to the network traffic;

wherein the processor is further configured to determine whether the second reverse identification result carrying flag is true, and if it is true, insert the first identification result in an extension field of a header of the next data packet; and the transmitter is further configured to send the next data packet carrying the first identification result to the first downstream device.

16. The network element according to claim 10, wherein the receiver is further configured to:

after the transmitter sends the data packet carrying the second identification result to the first downstream device, receive a response packet, wherein the response packet is generated by a server or user equipment after the server or user equipment receives the data packet, and is forwarded by the first downstream device to the identification function network element;

the processor is further configured to identify the response packet; and after successfully identifies the response packet, acquire the first identification result, save the first identification result in the local flow table, and insert the first identification result in an extension field of a header of a next data packet received by the identification function network element, wherein the next data packet belongs to the network traffic.

17. An identification function network element, comprising:
a receiver, a transmitter, a memory, and a processor, wherein the memory stores an executable program code and a local flow table of the identification function network element;
the receiver configured to receive a data packet in network traffic;
the processor being configured to read the executable program code stored in the memory so as to:
perform deep packet inspection (DPI) identification on the data packet;
when a first identification unit successfully identifies the data packet, save a first identification result obtained through identification in a local flow table of the identification function network element and insert the first identification result in an extension field of the header of the data packet, and
when the first identification unit fails to identify the data packet, insert a second identification result in the header extension field of the data packet, wherein the second identification result is an initialization identification result produced when the identification function network element creates the local flow table; and
the transmitter configured to send the data packet carrying the first identification result or the second identification result to a first downstream device.

18. The identification function network element according to claim 17, wherein if the data packet is the first data packet received by the identification function network element in the network traffic, the processor further being configured to read the executable program code stored in the memory so as to:
after the inserting a second identification result in the header extension field of the data packet, insert an identification first packet flag in the extension field of the header of the data packet, so that the first downstream device sends a response packet carrying the first identification result to the identification function network element after receiving the data packet carrying the identification first packet flag, wherein the response packet further comprises a response message generated by a server or user equipment after the server or user equipment receives the data packet, and the identification first packet flag is used for marking the first data packet that enters the identification function network element for identification in the network traffic.

* * * * *